US006473493B2

(12) United States Patent
Kenmochi et al.

(10) Patent No.: US 6,473,493 B2
(45) Date of Patent: *Oct. 29, 2002

(54) COMMUNICATION APPARATUS FOR RECEIVING IDENTIFICATION INFORMATION OF PARTNER STATION, AND EXECUTING COMMUNICATION OPERATION IN ACCORDANCE WITH RECEIVED IDENTIFICATION INFORMATION

(75) Inventors: Toshio Kenmochi, Yokohama (JP); Sadasuke Kurahayashi, Niiza (JP); Takehiro Yoshida, Tokyo (JP); Naoji Hayakawa, Machida (JP); Shigeki Ohno, Machida (JP); Yoshio Yoshiura, Kanagawa-ken (JP); Kazutaka Matsueda, Yokohama (JP); Motoaki Yoshino, Fujisawa (JP); Fumiyuki Takiguchi, Yokohama (JP); Kazuto Yanagisawa, Toride (JP); Hideki Shimizu, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,431
(22) Filed: Jan. 30, 1998
(65) Prior Publication Data
   US 2001/0040946 A1 Nov. 15, 2001

Related U.S. Application Data

(63) Continuation of application No. 08/397,356, filed on Mar. 2, 1995.

(30) Foreign Application Priority Data

Mar. 4, 1994 (JP) .............................................. 6-60151
Apr. 15, 1994 (JP) .............................................. 6-77012
May 13, 1994 (JP) .............................................. 6-124282

(51) Int. Cl.$^7$ ............................................. H04M 11/00
(52) U.S. Cl. ..................................... 379/16; 379/142.07
(58) Field of Search ...................... 379/100.16, 100.15, 379/100.14, 100.06, 100.01, 93.09, 93.11, 142, 102.02, 102.01, 142.01, 142.06, 142.07, 142.15; 358/400, 401, 434, 440, 442

(56) References Cited

U.S. PATENT DOCUMENTS 4,677,600 A   6/1987   Yoshida
4,729,033 A   3/1988   Yoshida (List continued on next page.)

FOREIGN PATENT DOCUMENTS

JP           2158250      6/1990     ................... 379/53

*Primary Examiner*—Stella Woo
(74) *Attorney, Agent, or Firm*—Fitzpatrick, Cella, Harper & Scinto

(57) ABSTRACT

A communication apparatus receives the identification information of a partner station, and performs a communication operation in accordance with the received identification information. A first detecting unit detects a calling signal. An identification information receiving unit detects the identification information of a calling party upon detection of the calling signal, and a second detecting unit detects whether or not the terminal of the calling party is a data communication terminal. A registration unit registers the identification information of the partner station in a memory, so that whether the partner station is a speech or data communication terminal can be discriminated later. A control unit checks if the identification information receiving unit receives the identification information of the calling party. When the identification information of the calling party is received, the control unit checks if the received identification information is registered in the memory, and selectively executes a speech communication process and a data communication process in accordance with the checking result and the detection result of the second detecting unit.

18 Claims, 35 Drawing Sheets

U.S. PATENT DOCUMENTS

| | | |
|---|---|---|
| 4,800,439 A | 1/1989 | Yoshino |
| 4,815,121 A | 3/1989 | Yoshino |
| 4,823,375 A | 4/1989 | Yoshida |
| 4,843,479 A | 6/1989 | Yoshino et al. |
| 4,932,048 A | 6/1990 | Kenmochi |
| 5,003,595 A | 3/1991 | Collins et al. ................. 379/95 |
| 5,022,071 A | 6/1991 | Mozer et al. ............... 379/100 |
| 5,189,696 A | 2/1993 | Yoshida ...................... 379/355 |
| 5,200,992 A | 4/1993 | Yoshino |
| 5,276,731 A | 1/1994 | Arbel et al. ................. 379/100 |
| 5,307,178 A | 4/1994 | Yoneda ..................... 358/440 |
| 5,307,179 A | 4/1994 | Yoshida |
| 5,317,630 A | 5/1994 | Feinberg et al. ............. 379/142 |
| 5,351,289 A | 9/1994 | Logsdon et al. ............. 379/142 |
| 5,377,260 A * | 12/1994 | Long ....................... 379/93.09 |
| 5,388,150 A * | 2/1995 | Schneyer et al. ............ 379/142 |
| 5,394,445 A | 2/1995 | Ball et al. .................... 379/142 |
| 5,442,686 A | 8/1995 | Wada et al. ................ 379/100 |
| 5,517,557 A | 5/1996 | Tanaka ....................... 379/100 |
| 5,600,712 A * | 2/1997 | Hanson et al. .............. 379/142 |
| 5,877,872 A * | 3/1999 | Nomura et al. .......... 379/93.09 |
| 5,960,068 A * | 9/1999 | Yoshida et al. ........ 379/100.16 |

\* cited by examiner

FIG. 11

| TEL NUMBER OF BK TERMINAL _1-4-1 | TEL NUMBER OF FAX COMM TERMINAL _1-4-2 | TEL NUMBER OF SPEECH COMM TERMINAL _1-4-3 | TEL NUMBER OF FAX/SPEECH COMM TERMINAL _1-4-4 |
|---|---|---|---|
| 012-345-6789 | 0123-45-1234 | 0211-67-8941 | 03-3762-3421 |
| 056-789-1234 | 03-6897-5121 | 03-3562-1786 | 03-3762-3568 |
| ......... | 0423-89-6152 | 03-3621-1926 | 0123-45-4321 |
|  | ........ | ........ | ........ |

FIG. 13

COMM MANAGEMENT INFORMATION

| NO. | REGISTERED (○:TRUE) | TEL NUMBER | CONTENTS | DATE |
|---|---|---|---|---|
| 1 | ○ | 012-345-6789 | REJECTED | '94/3/2 AM 10:20 |
| 2 |  | 03-1111-5151 | FAX (7 PAGES) | '94/3/2 AM 11:10 |
| 3 | ○ | 03-6897-5121 | FAX (2 PAGES) | '94/3/2 PM 1:25 |
| 4 | ○ | 03-3621-1926 | SPEECH (5 MIN 21 SEC) | '94/3/3 AM 10:30 |
| 5 |  | 03-3111-1616 | SPEECH (20 SEC) | '94/3/3 PM 2:10 |
| 6 |  | 04-2162-3737 | FAX (3 PAGES) | '94/3/4 AM 11:30 |
| 7 | ○ | 056-789-1234 | REJECTED | '94/3/4 PM 1:50 |
| ⋮ | ⋮ | ⋮ | ⋮ | ⋮ |
| 39 |  | 05-8631-9164 | SPEECH (10 MIN 5 SEC) | '94/3/4 PM 5:00 |
| 40 |  | 045-862-1216 | AUTO ANS/REC (1 MIN 20 SEC) | '94/3/4 PM 8:20 |

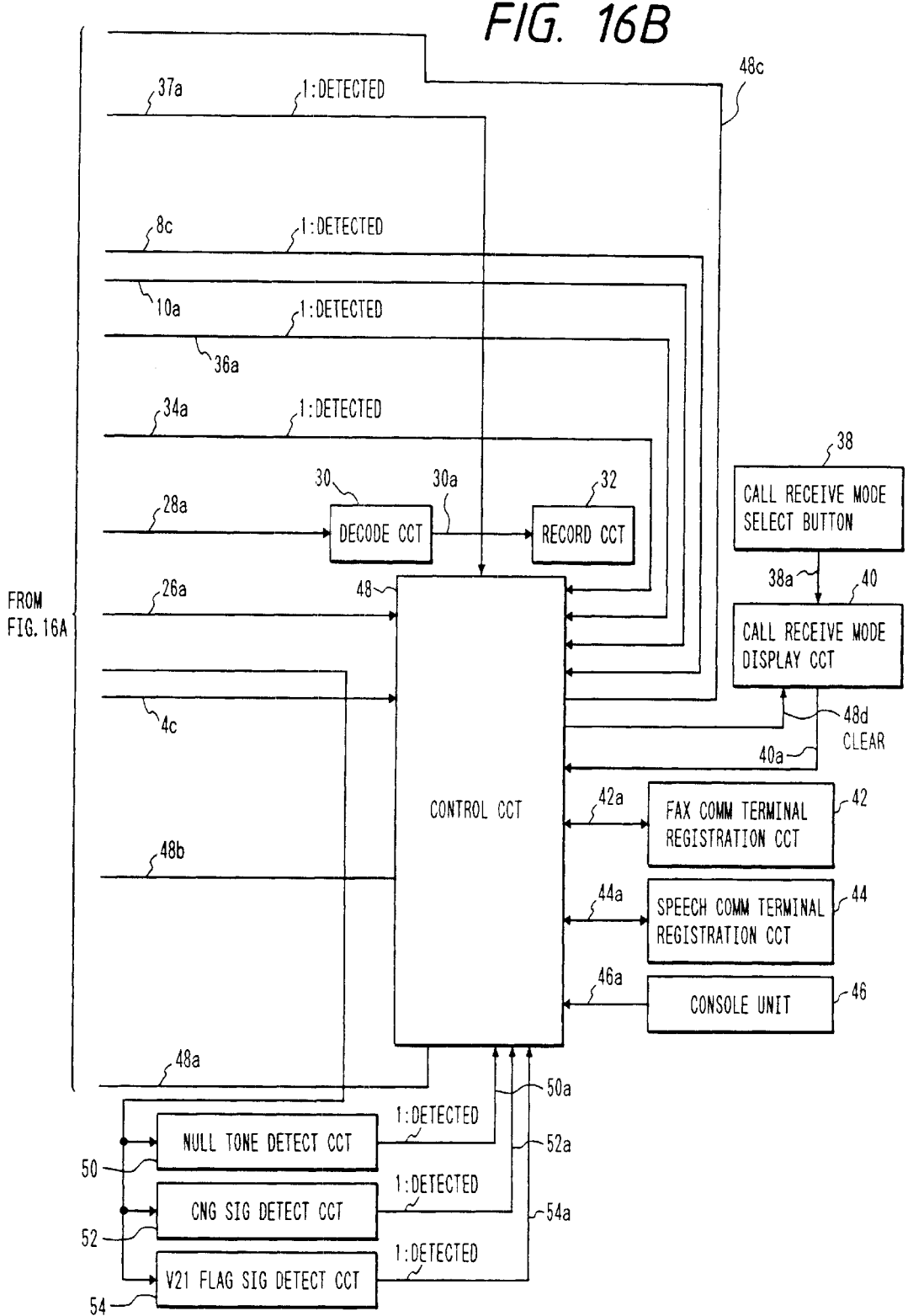

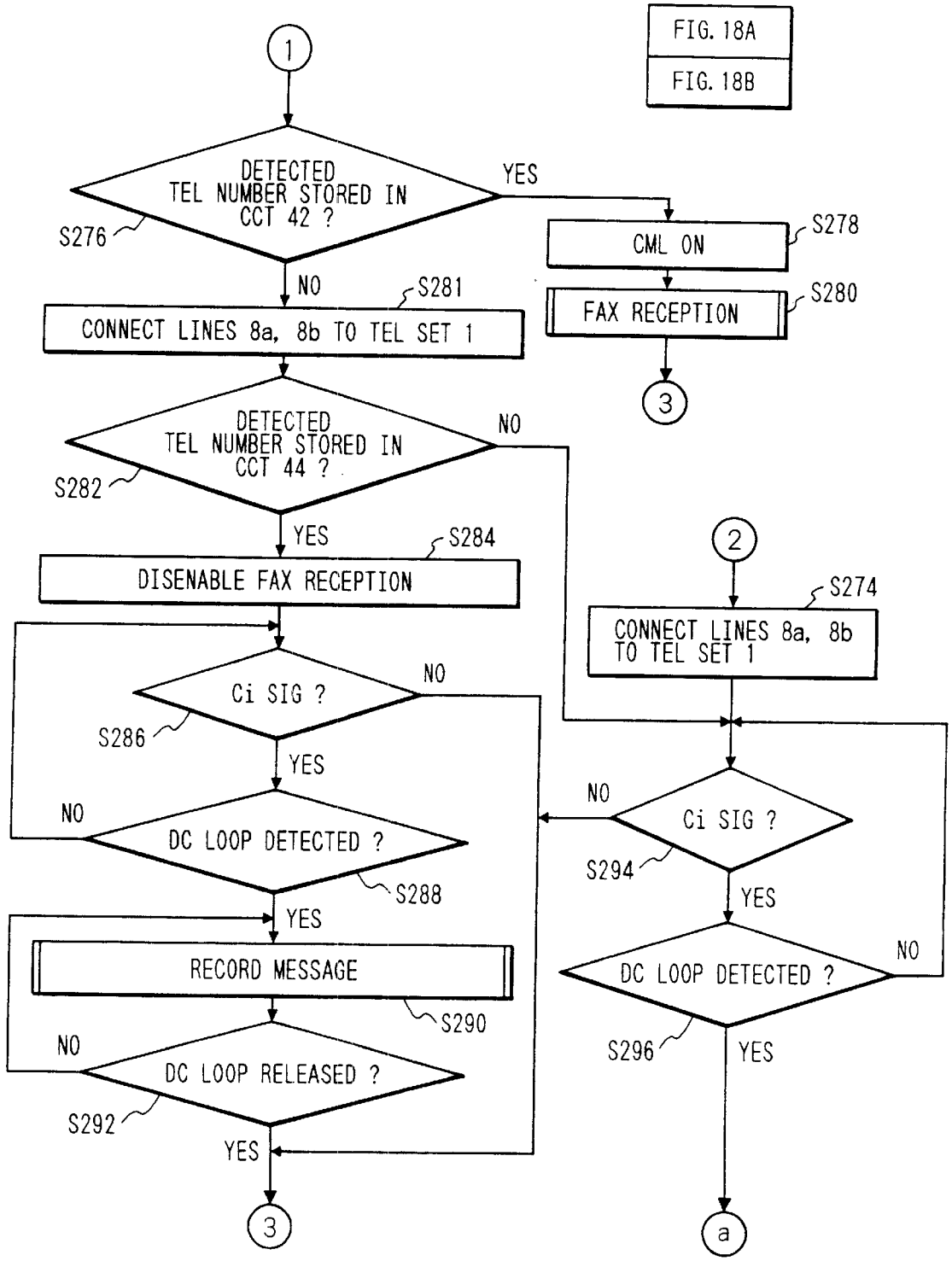

| FIG. 20A |
| FIG. 20B |

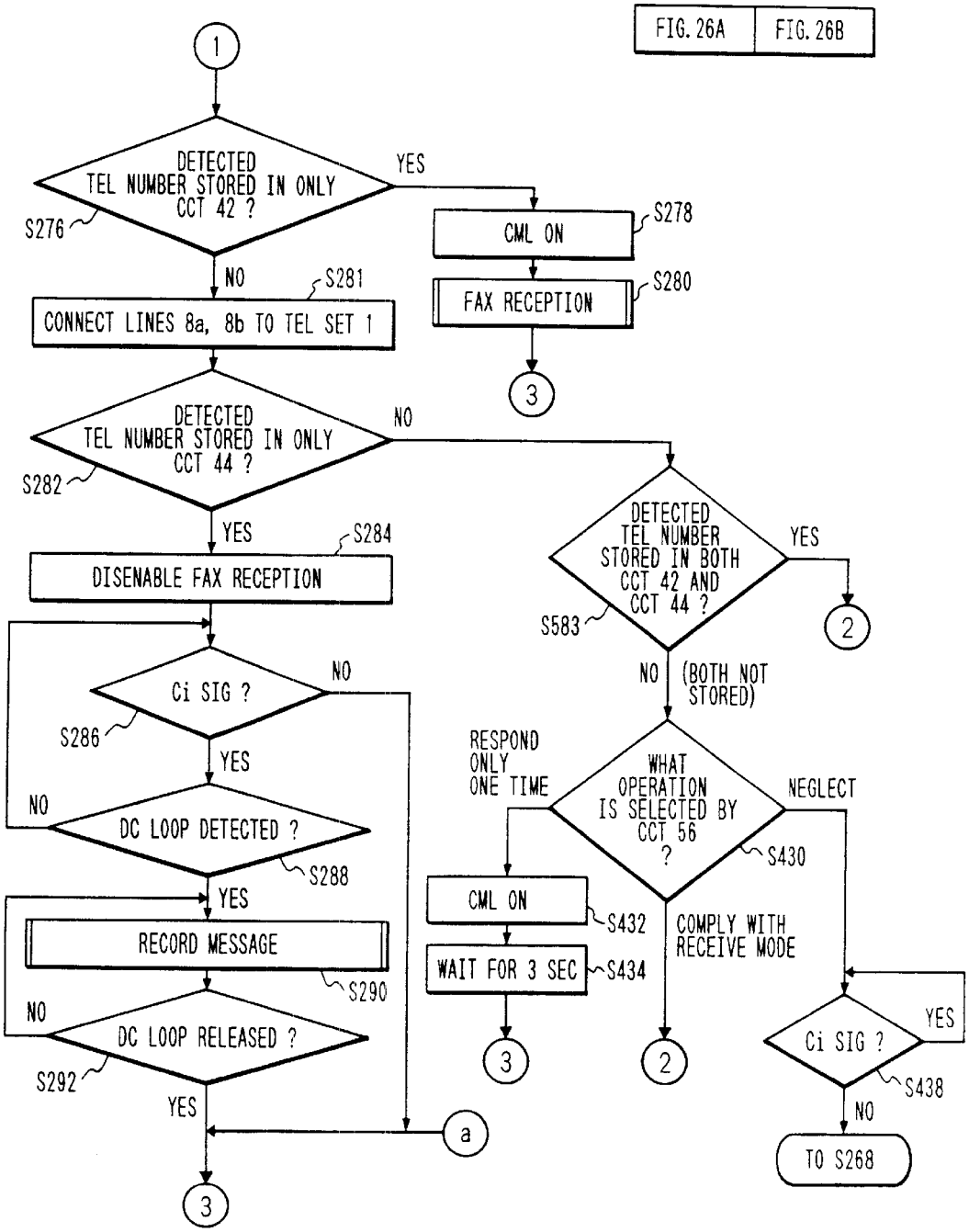

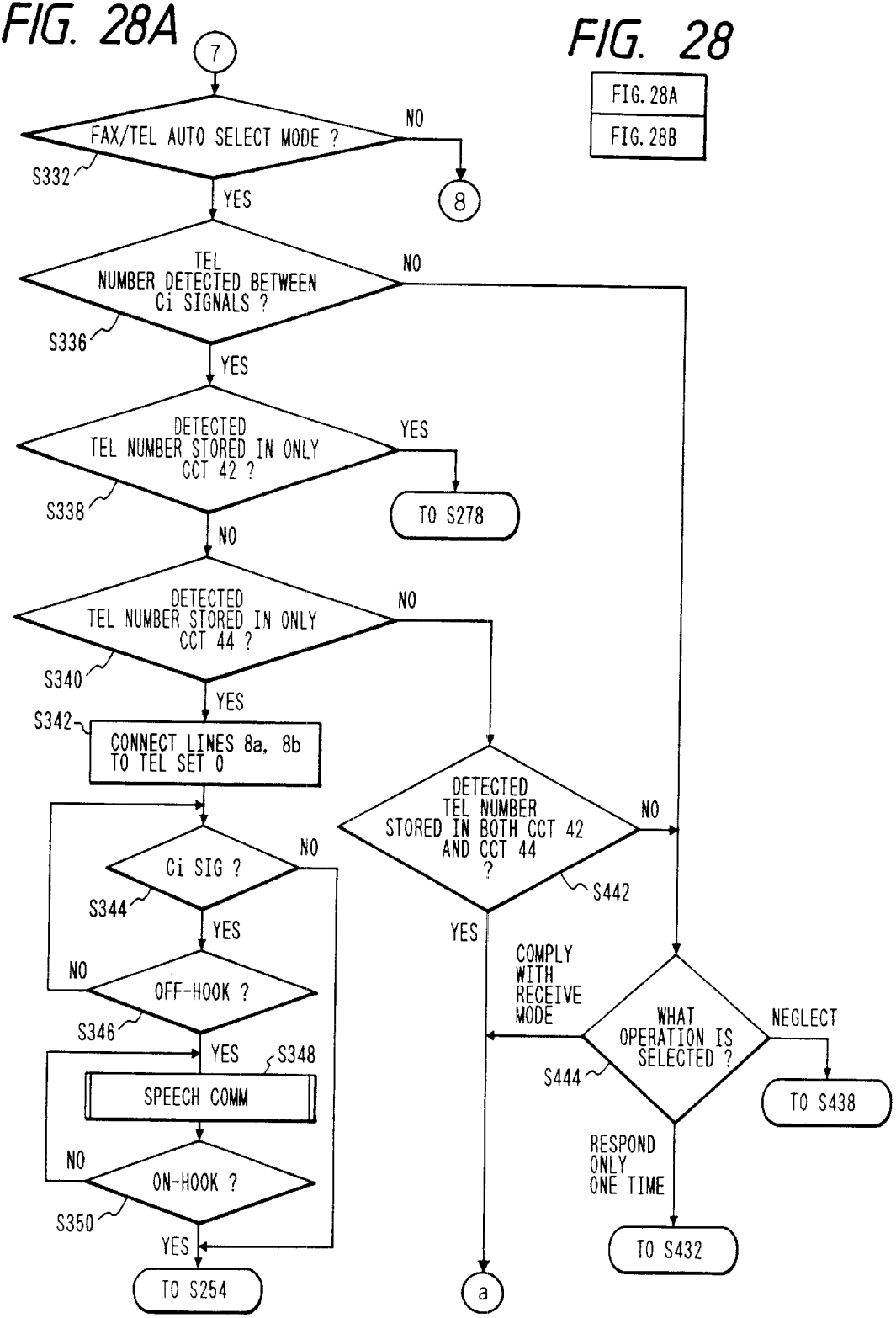

COMMUNICATION APPARATUS FOR RECEIVING IDENTIFICATION INFORMATION OF PARTNER STATION, AND EXECUTING COMMUNICATION OPERATION IN ACCORDANCE WITH RECEIVED IDENTIFICATION INFORMATION

This application is a continuation of Application Ser. No. 08/397,356, filed on Mar. 2, 1995.

BACKGROUND OF THE INVENTION

1. Field of the Invention

The present invention relates to a communication apparatus for receiving the identification information of a partner-station, and performing a communication operation in accordance with the received identification information.

2. Related Background Art

As a conventional apparatus of this type, for example, a facsimile apparatus receives a procedure signal upon connection of a line with a partner station. The procedure signal received from the partner station includes information such as the name and telephone number of the partner station. The telephone numbers of partner stations are registered in advance in a memory of the facsimile apparatus, and the facsimile apparatus checks based on the procedure signal if the received telephone number is registered in the memory. The facsimile apparatus permits facsimile reception from only a partner station registered in the memory, or rejects facsimile reception from a partner station registered in the memory. Such a facsimile apparatus is known.

However, the above-mentioned facsimile apparatus can only make selection as to whether or not a facsimile communication is performed.

On the other hand, some user's commonly use a single telephone line for a speech communication using a telephone set, and for a facsimile communication. Thus, in order to obviate a user's operation for manually switching the telephone line between a speech communication. and a facsimile communication, the patent applications (U.S. Pat. Nos. 4,800,439 and 4,677,660) in which a facsimile apparatus detects upon connection of a line whether or not a signal associated with a facsimile communication is received, and automatically switches the telephone line between a speech communication and a facsimile communication, have been proposed.

However, in the above-mentioned U.S. Patent applications, since the facsimile apparatus-must monitor a received signal for a predetermined period of time, a relatively long time is required until an actual speech or facsimile communication can be started.

As a service of a telephone office, a service for informing the telephone number of a calling station between adjacent calling (or ringing) signals (Ci signals) upon reception of an incoming call is available.

SUMMARY OF THE INVENTION

It is an object of the present invention to provide a communication apparatus which can switch a telephone line between a speech communication and a data communication within a short period of time in consideration of the above-mentioned situation.

It is another object of the present invention to provide a communication apparatus which allows an efficient registration process of reference identification information of a partner station.

It is still another object of the present invention to provide a communication apparatus which registers received identification information of a partner station as reference identification information.

Other objects of the present invention will become apparent from the detailed description of the preferred embodiments taken in conjunction with the accompanying drawings.

BRIEF DESCRIPTION OF THE DRAWINGS

FIG. 11 is a table showing a registration list in a RAM 1-4;

FIG. 13 is a table showing communication management information in the RAM 1-4;

DETAILED DESCRIPTION OF THE PREFERRED EMBODIMENTS

The preferred embodiments of the present invention will be described in detail below with reference to the accompanying drawings.

In the embodiments to be described below, a facsimile apparatus will be exemplified. The present invention is not limited to the facsimile apparatus but is applicable to various other communication apparatuses such as telephone sets, teletex, and the. like.

First Embodiment

Figure 1:
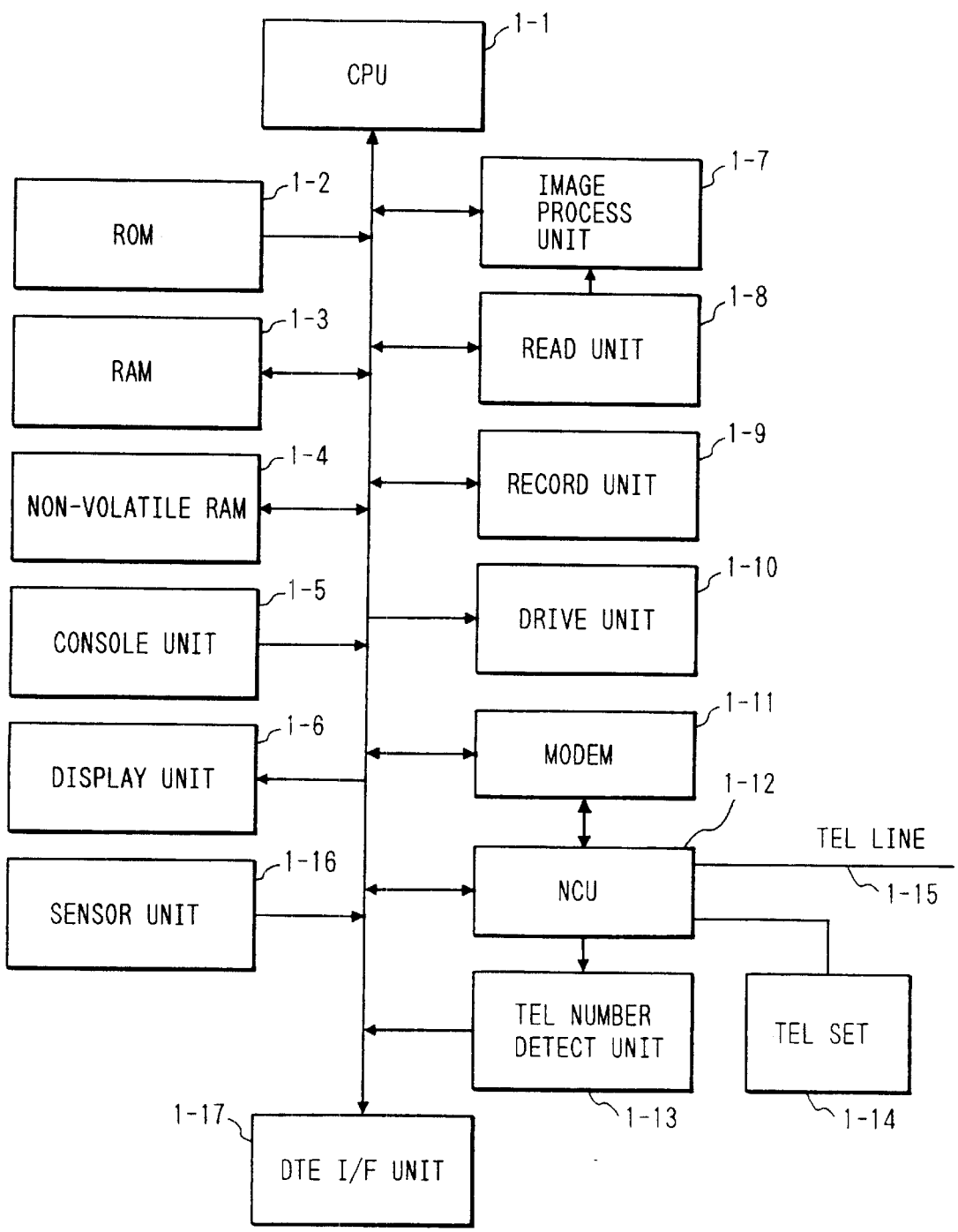
FIG. 1 is a block diagram of a communication apparatus according to the first embodiment of the present invention.

FIG. 1 is a block diagram showing the arrangement of the facsimile apparatus of this embodiment.

In accordance with programs stored in a ROM 1-2, a CPU 1-1 controls the entire facsimile apparatus, i.e., a RAM 1-3, a non-volatile RAM 1-4, a console unit 1-5, a display unit 1-6, an image process unit 1-7, a read unit 1-8, a record unit 1-9, a drive unit 1-10, a modem 1-11, and an NCU unit 1-12, and exchanges commands with a DTE (Data Terminal Equipment) via a DTE interval 1-17.

These units will be described below.

The RAM 1-3 stores binary image data read by the read unit 1-8, and binary data which is input from a subscriber line 1-15 and is demodulated via the modem 1-11.

The non-volatile RAM 1-4 is a battery backed-up SRAM, and stores data such as telephone numbers unique to the apparatuses, users' abbreviations, and the like, communication results, rejected telephone numbers, and the like, as will be described in detail later.

The console unit 1-5 has a start key for transmission/reception, a mode key for designating operation modes such as a fine mode, standard mode, and the like of an image to be transmitted, a copy key for a copy mode, a mode key for selecting an operation mode based on a command from the DTE, a stop key for stopping an operation, a transfer key for transferring a caller's telephone number, which is detected by the modem and is temporarily stored in the RAM 1-3, to the non-volatile RAM 1-4, and the like.

Note that the CPU 1-1 detects the depression state of each of these keys, and controls the respective units in accordance with the detected state.

The display unit 1-6 comprises a dot-matrix type LCD-(liquid crystal display), and an LCD driver, and makes various displays under the control of the CPU 1-1.

The read unit 1-8 comprises a DMA (Direct Memory Access) controller, a CCD (Charge Coupled Device) or a contact type image sensor (CS), a versatile IC, a binarization circuit, and the like. The read unit 1-8 binarizes data read using the CCD or CS, and sequentially supplies the binary data to the RAM 1-3 under the control of the CPU 1-1.

Also, the read unit 1-8 supplies the read image data to the image process unit 1-7, and transfers the processed data to the RAM 1-3.

The record unit 1-9 comprises a DMA controller, a B4/A4-size-thermal or bubble-jet printer head, a versatile IC, and the like. The record unit 1-9 reads out recording data stored in the RAM 1-3, and prints it out as a hard copy under the control of the CPU 1-1.

The drive unit 1-10 comprises stepping motors for driving paper supply/discharge rollers of the read unit 1-8 and the record unit 1-9, gears for transmitting the drive forces of the motors, driver circuits for controlling the motors, and the like.

The modem 1-11 comprises V.34, V.32, V.32bis, V.17, V.29, V.27ter, V.23, V.21(H,L), and V.8 modems, a clock generator connected to these modems, and the like. The modem 1-11 modulates transmission data stored in the RAM 1-3 and outputs the modulated data on to the subscriber line 1-15 via the NCU unit 1-12 under the control of the CPU 1-1.

Furthermore, the modem 1-11 receives an analog signal input from the subscriber line 1-15 via the NCU unit 1-12, demodulates the received signal to obtain binary data, and stores the binary data in the RAM 1-3.

The NCU unit 1-12 comprises a DC detection circuit, an AC detection circuit, a Ci (calling signal) detection circuit, and a two-wire-to-four-wire conversion circuit, and connects the subscriber line 1-15 to the modem 1-11.

Furthermore, a handset 1-14 can be connected to the NCU unit 1-12.

Figure 12:
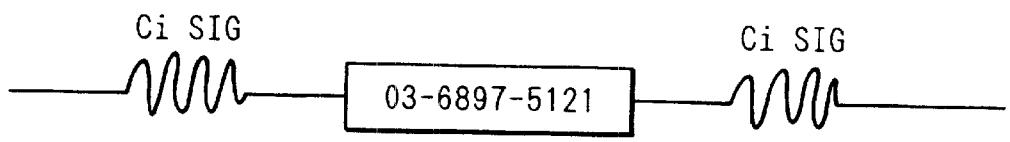
FIG. 12 is a view showing calling signals (Ci signals) and telephone number data from an exchange.

A telephone number detect unit 1-13 seizes a line in an AC manner at 600 Ω, and detects the telephone number of a partner station generated by the exchange between adjacent Ci signals (calling signals). As shown in FIG. 12, the exchange outputs telephone number data of a calling party between adjacent Ci signals.

The line 1-15 is a subscriber line of a public telephone network connected to the NCU unit 1-9.

A sensor unit 1-16 comprises a recording sheet width sensor, a recording sheet presence/absence sensor, an original width sensor, and an original presence/absence sensor, and detects the-states of an original. and a recording sheet under the control of the CPU 1-1.

The DTE interface 1-17 is an interface between the communication apparatus of this embodiment and the DTE, and comprises an RS-232C interface in this embodiment (a parallel interface may be used).

Figure 2:
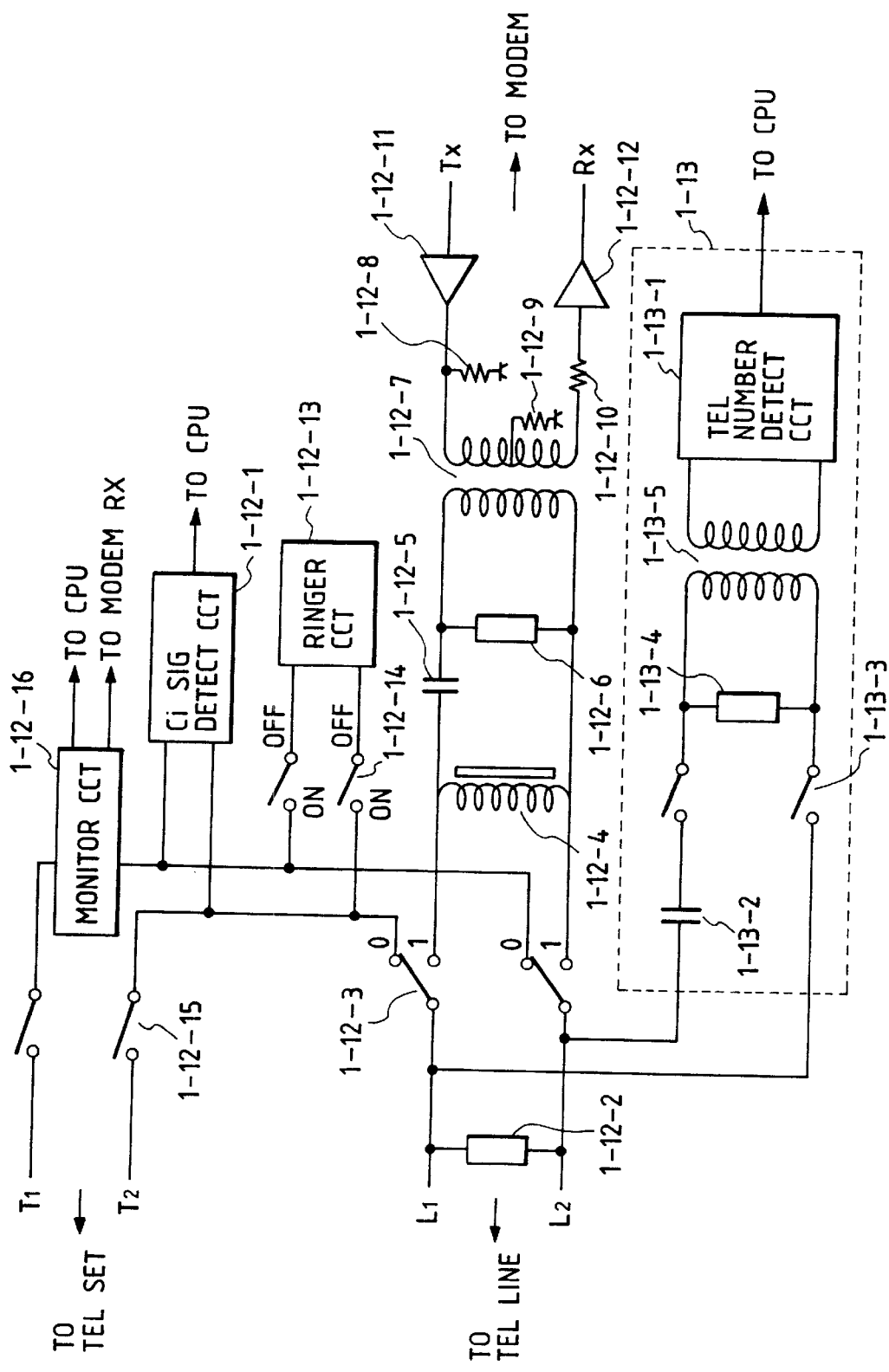
FIG. 2 is a circuit diagram showing the arrangement of an NCU unit according to the first embodiment of the present invention.

FIG. 2 is a detailed circuit diagram of the NCU unit 1-12 and the telephone number detect unit 1-13 in this embodiment. The circuit shown in FIG. 2 will be described below.

1-12-1: A circuit for detecting a Ci signal indicating call reception and output from the exchange. The circuit 1-12-1 outputs a Ci detection signal to the CPU upon detection of the Ci signal, thereby informing detection of the Ci signal.

1-12-2: A surge absorber which is inserted between lines, and removes external noise.

1-12-3: A CML relay for switching the lines between the telephone set and the modem.

1-12-4: An RET coil for DC-seizing the lines.

1-12-5: A capacitor.

1-12-6: A varistor.
1-12-7: A hybrid transformer for separating the lines to the primary and secondary sides.
1-12-8, 9, 10: Resistors.
1-12-11, 12: Operation amplifiers.
1-12-13: A ringer circuit which rings in response to a Ci signal.
1-12-14: Switches for turning on/off the lines and the ringer circuit.
1-12-15: Switches for disconnecting the lines from the telephone set.
1-12-16: A monitor circuit for monitoring a speech communication signal by the telephone set 1-14 via the modem 1-11. The monitor circuit 1-12-16 informs the hook state of the telephone set 1-14 to the CPU 1-1 on the basis of the presence/absende of a speech communication current.
1-13-1: A telephone number detect circuit.
1-13-2:. A capacitor for AC-seizing the lines.
1-13-3:. Switches for disconnecting the lines from. the telephone number detect circuit and the like.
1-13-4: A varistor for protecting the lines.
1-13-5: A transformer for separating the lines to the primary and secondary sides.

The control operation of the CPU 1-1 of this embodiment will be described below with reference to the circuit diagram shown in FIG. 2 and the flow charts shown in FIGS. 3, 4, 5, 6, 7, and 8.

The communication apparatus of this embodiment turns off the switches 1-12-3, 1-12-14, and 1-12-15 (FIG. 2), and initializes the CML relay (FIG. 2) to the [0] side, in step S1. With this operation, even when a Ci signal is input from the line, the ringer circuit of this communication apparatus and the telephone set connected thereto do not ring.

If a Ci signal from the line is detected in step S2, the switches 1-13-3 are turned on in step S3 to connect the line to the telephone number detect circuit. In step S4, detection of the telephone number of a partner station is started. If it is determined in step S5 that the telephone number detect circuit detects the telephone number of the partner station, the detected data is stored in the RAM 1-3 in step S6.

In step S7, the telephone number of the partner station, which has just been detected, is compared with telephone numbers in a list (see FIG. 11), which is registered in the RAM 1-4 and includes the telephone: numbers-of call-reception rejected terminals (to be referred to as BK terminals hereinafter), the telephone numbers of facsimile communication terminals, and the telephone numbers of speech communication terminals. Based on the comparison result in step S7, the operations in step S8 and subsequent steps are executed.

If it is determined in step S8 that the detected telephone number is that of a BK terminal, the CML relay is turned on in step S9 to temporarily seize the line. In step S10, the control waits for 500 ms (milliseconds). Thereafter, in step S11, the CML relay is turned off to release the line. Then, the control returns to a standby state. The wait time in step S10 can be set to be a time in which the network can determine that the call-receiving side answers once and then disconnects the line.

If it is determined in step S12 that the detected telephone number is that of a communication terminal (facsimile terminal), the CML relay is turned on in step S13, and facsimile reception is performed in step S14. Upon completion of the facsimile reception, the control returns to a standby state.

If it is determined in step S15 that the detected telephone number is that of a speech communication terminal, the switches 1-12-14 and 1-12-15 are turned. on in step S16 to connect the line to the ringer circuit of this communication apparatus and the external telephone set TEL (1-14) without seizing the line. Thus, the communication apparatus and the external telephone set generate ringing tones in response to the Ci signal from the line. An operator can know the presence of call reception from the line by the ringing tones, and sets the handset of the external telephone set in an off-hook state to perform a normal speech communication in step S17.

If the-detected telephone number does not coincide with any of those registered in the RAM 1-4, the flow advances to step S18. If it is determined in step S18 that the reception mode set via the console unit 1-5 is a manual-receive mode, the switches 1-12-14 and 1-12-15 are turned on in step S19 to connect the line to the ringer circuit of this communication apparatus and the external telephone set without seizing the line. Thus, the communication apparatus and the external telephone set generate ringing tones in response to the Ci signal from the line. An operator can know the presence of call reception from the line by the ringing tones, and sets the handset of the external telephone set in an off-hook state to perform a normal speech communication in step S20. Upon completion of the speech communication, the operations in step S44 and subsequent steps (to be described later) are performed.

If the reception mode is not a manual-receive mode, it is checked in step S21 if the mode set via the console unit 1-5 is a FAX/TEL auto select mode. If YES in step S21, the CML relay is turned on in step S22, and 5 seconds are set in a timer in step S23. If a CNG signal or a flag of a V.21 signal, or a continuous null tone for a predetermined period of time is detected by the modem 1-11 in step S24, facsimile reception is performed in step S25. Upon completion of the facsimile reception, the operations in step S36 and subsequent steps (to be described later) are performed.

If no signal is detected in step S24, it is checked in step S26 if the timer set in step S23 has reached a time-out state. The flow loops while detecting the signal in step S24 until YES is determined in step S26.

If YES in step S26, the switches 1-12-14 and 1-12-15 are turned on in step S27, and an operator is called using the display unit 1-6 by means of a sound, display, or the like in step S28. In step S29, a speech communication is performed. Upon completion of the speech communication, the operations in step S44 and subsequent steps are performed.

If the reception mode set via the console unit 1-5 is an auto answer/record telephone mode, the switches 1-12-14 and 1-12-15 are turned on in step S31 to connect an automatic answer/record telephone set to the line. In step S32, the automatic answer/record telephone set seizes the line in response to the Ci signal from the exchange, and records a message. In step S33, a CNG signal or a flag signal of a V.21 signal, or a null tone for a predetermined period of time or more is detected. In step. S34, the end of recording of the auto answer/record telephone set is detected.

If a CNG signal or the like is detected by the modem 1-11 via-the monitor circuit 1-12-16 in step S33, facsimile reception is performed in step S34. Upon completion of the facsimile reception, the operations in step S36 and subsequent steps (to be described later) are performed.

If it is determined in step S35 that the connected automatic answer/record telephone set completes the recording operation and is set in an on-hook state, this state is detected via the monitor circuit 1-12-16, and the operations in step S36 and subsequent steps are performed.

If it is determined in step S30 that the reception mode is not the auto answer/record telephone mode, other processes are performed in step S60.

The operation upon registration of the telephone number of a partner station after the end of facsimile reception will be explained below.

In step S36, a telephone number registration mode and a message indicating that a registration operation can be performed are displayed on the display unit 1-6. In step S37, 10 seconds are set in a key input timer.

In steps S38 and S39, the depression of a registration key on the console unit 1-5 or an elapse of the time set in step S37 is checked. If the timer has reached a time-out state, the control returns to a standby state. If the registration key is depressed and it is determined in step S40 that the depressed key is a BK terminal registration key, the telephone number of. the partner station detected in step S6 above is transferred from the RAM 1-3 to a BK list registration area (1-4-1 in FIG. 11) of the RAM 1-4 in step S41, and the control returns to a standby state.

If the depressed key. is not a BK terminal registration key, but it is determined in step S42 that the depressed key is a communication permissible terminal registration key, the telephone number of the partner station detected in step S6 above is transferred from the RAM 1-3 to a facsimile (or data) communication permissible terminal area (1-4-2 or 1-4-4 in FIG. 11) of the RAM 1-4 in step S43, and the control returns to a standby state.

The operation upon registration of the telephone number of a partner station after the end of a speech communication will be explained below.

In step S44, a telephone number registration mode and a message indicating that a registration operation can be performed are displayed on the display unit 1-6. In step S45, 10 seconds are set in the key input timer.

In steps S46 and S47, the depression of a registration key on the console unit 1-5 or an elapse of the time set in step S45 is checked. If the timer has reached a time-out state, the control returns to a standby state. If the registration key is depressed and it is determined in step S46 that the depressed key is a BK terminal registration key, the telephone number of the partner station detected in step S6 above is transferred from the RAM 1-3 to the BK list registration area of the RAM 1-4 in step S48, and the control returns to a standby state.

If the depressed key is not a BK terminal registration key, but it is determined in step S50 that the depressed key is a communication permissible terminal registration key, the telephone number of the partner station detected in step S6 above is transferred from the RAM 1-3 to a speech communication permissible terminal area (1-4-3 or 1-4-4 in FIG. 11) of the-RAM 1-4 in step S51, and the control returns to a standby state.

Figure 9:
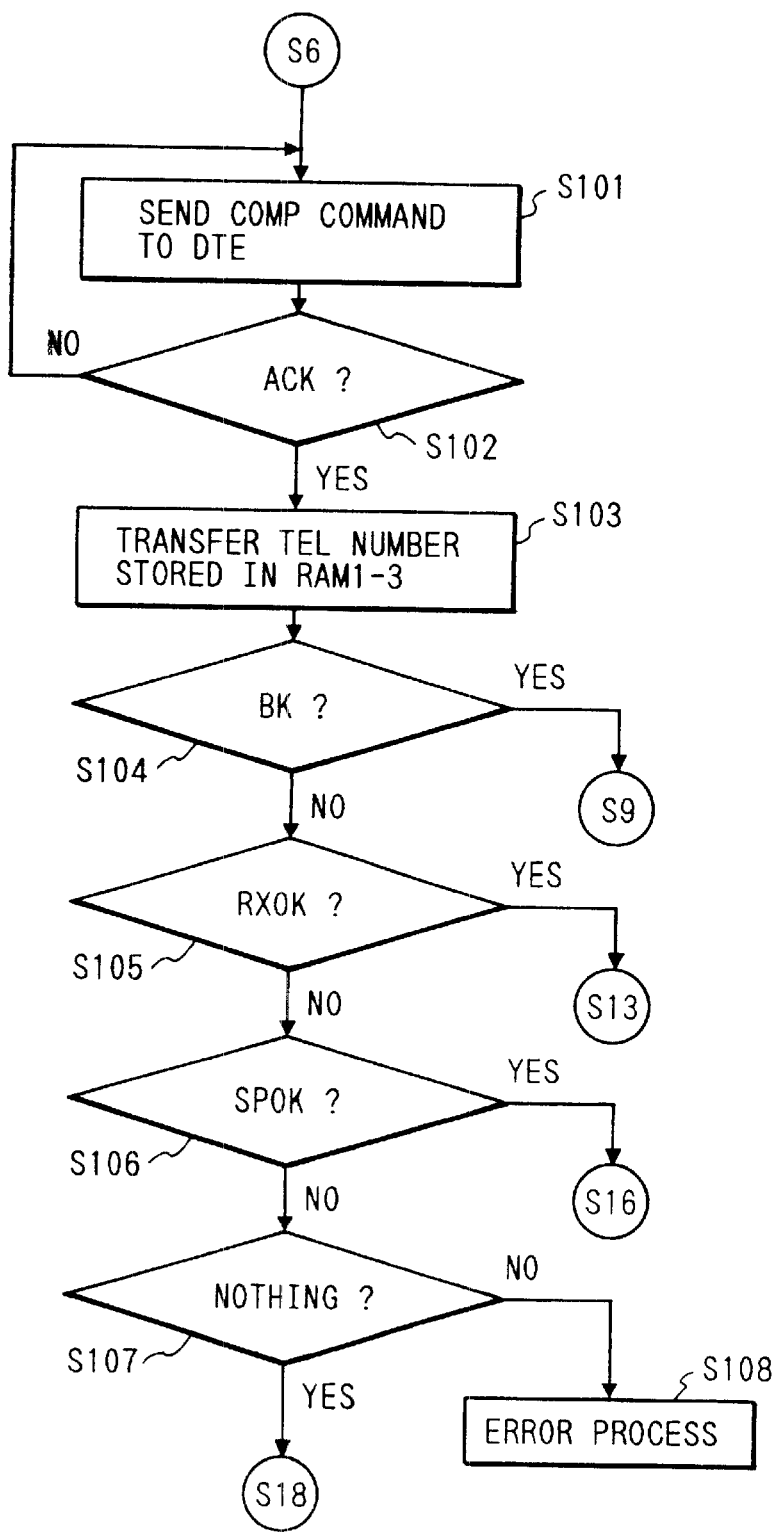
FIG. 9 is a flow chart showing the control operation of the CPU 1-1 in the other aspect of the embodiment.
Figure 10:
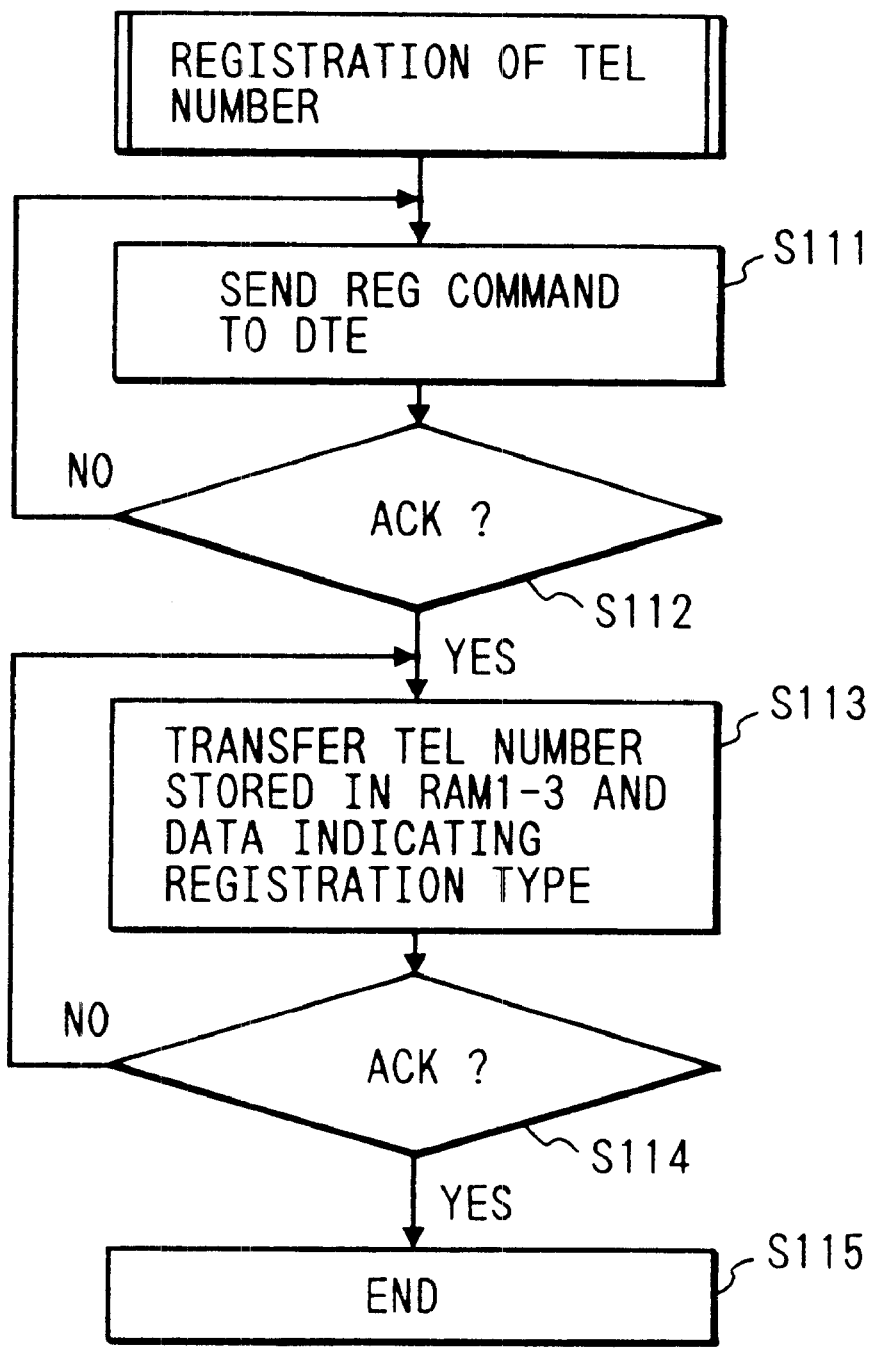
FIG. 10 is a flow chart showing the control operation of the CPU 1-1 in the other aspect of the embodiment.

The operation executed when the CPU 1-1 transfers telephone number data of a calling party, which is output from the exchange, to the data terminal DTE such as a PC (personal computer) connected to the communication apparatus of this embodiment, and controls the data terminal to perform a comparison/storage operation of the transferred telephone number data will be described below with reference to the flow charts shown in FIGS. 9 and 10.

A telephone number comparison operation by the DTE will first be described with reference to FIG. 9.

Figure 3:
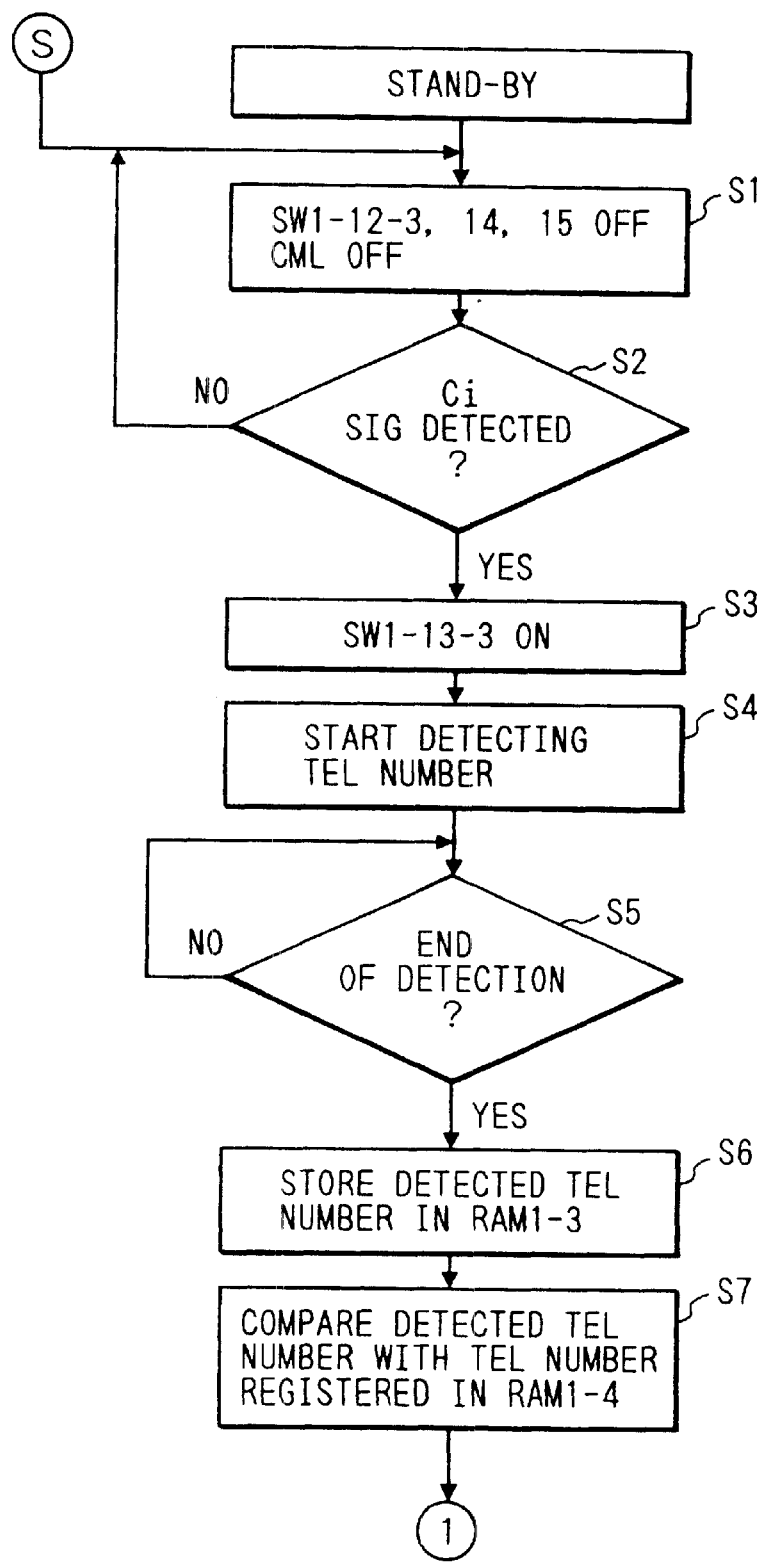
FIG. 3 is a flow chart-showing the control operation of a CPU 1-1 in the first embodiment.
Figure 4:
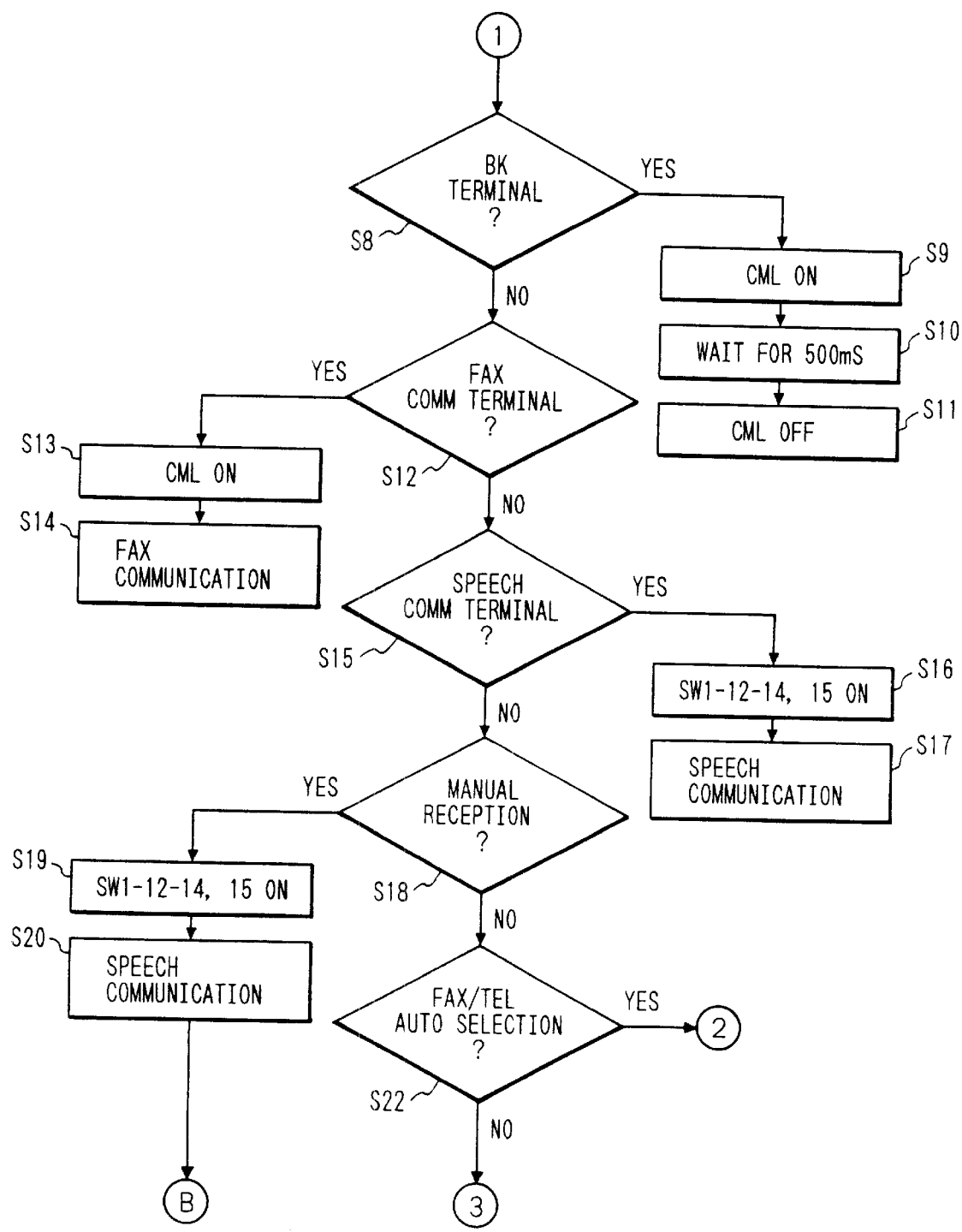
FIG. 4 is a flow chart showing the control operation of the CPU 1-1 in the first embodiment.
Figure 5:
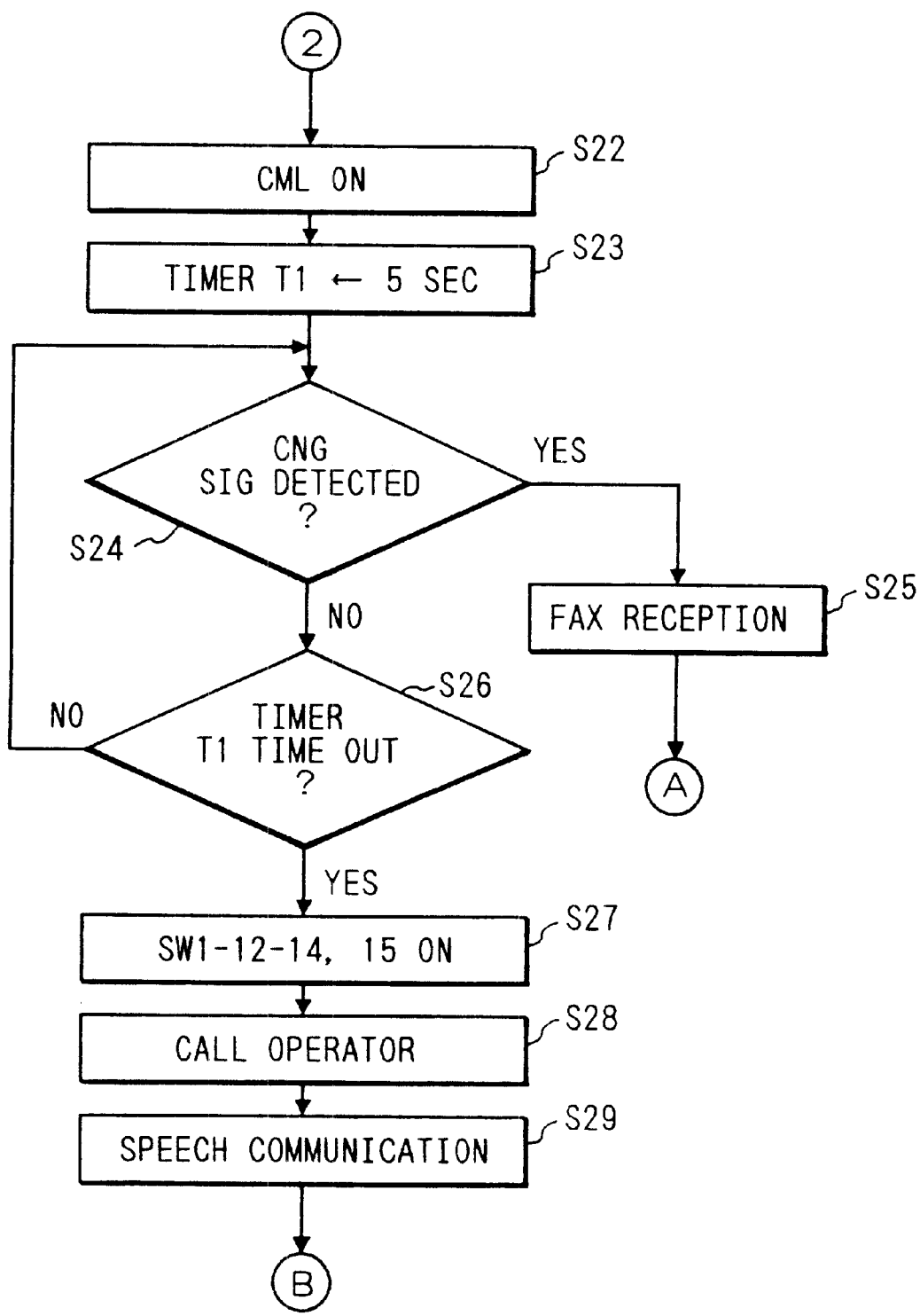
FIG. 5 is a flow chart showing the control operation of the CPU 1-1 in the first embodiment.
Figure 6:
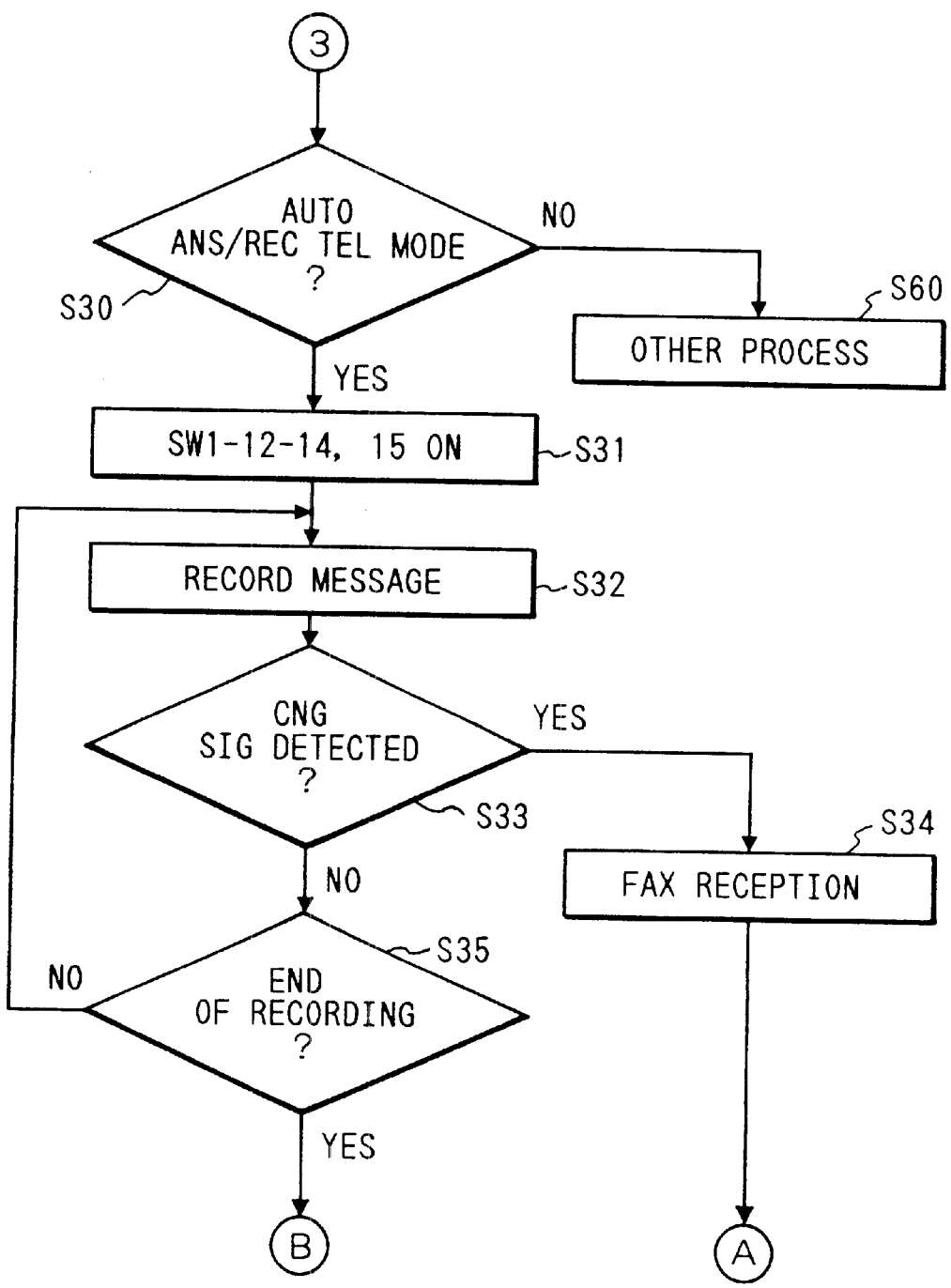
FIG. 6 is a flow chart showing the control operation of the CPU 1-1 in the first embodiment.
Figure 7:
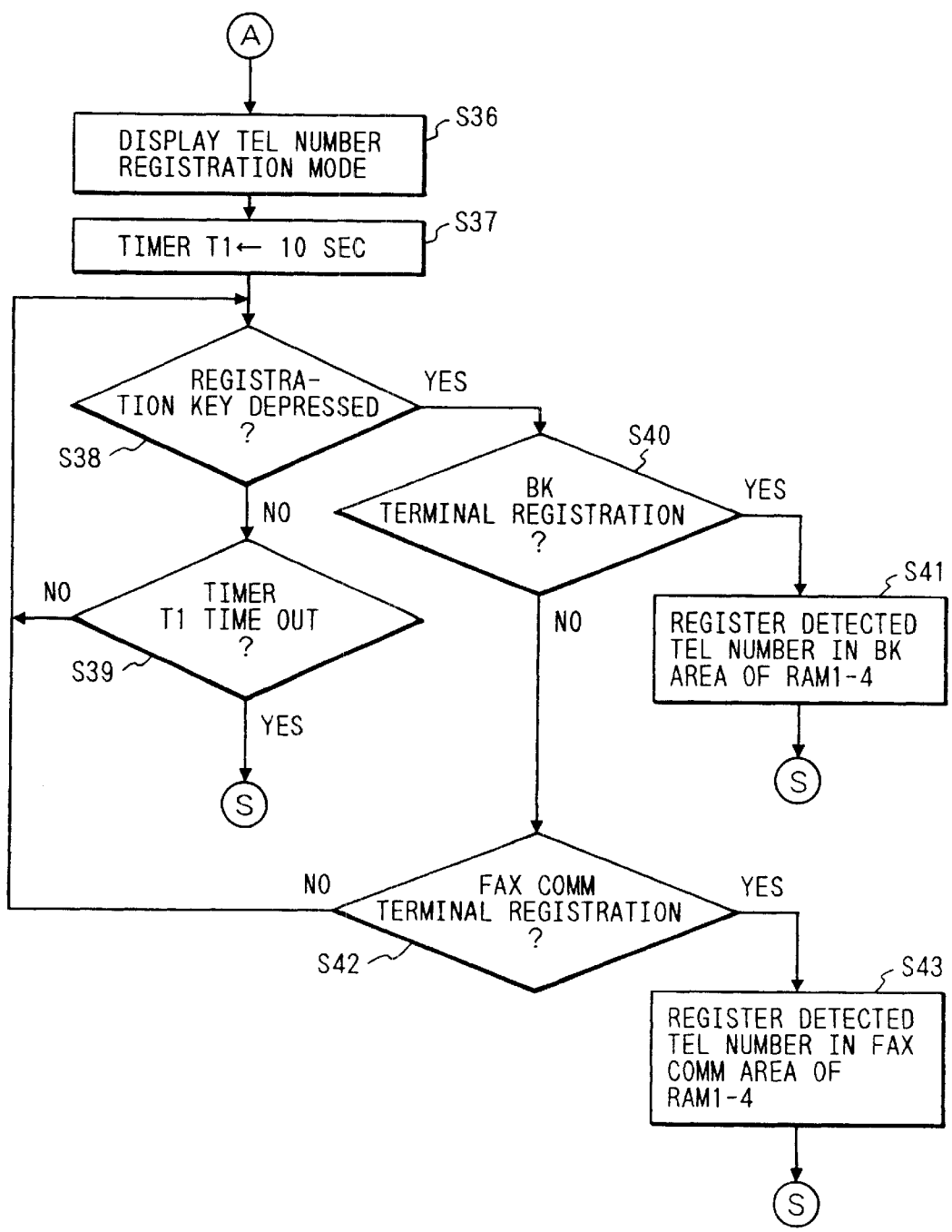
FIG. 7 is a flow chart showing the control operation of the CPU 1-1 in the first embodiment.
Figure 8:
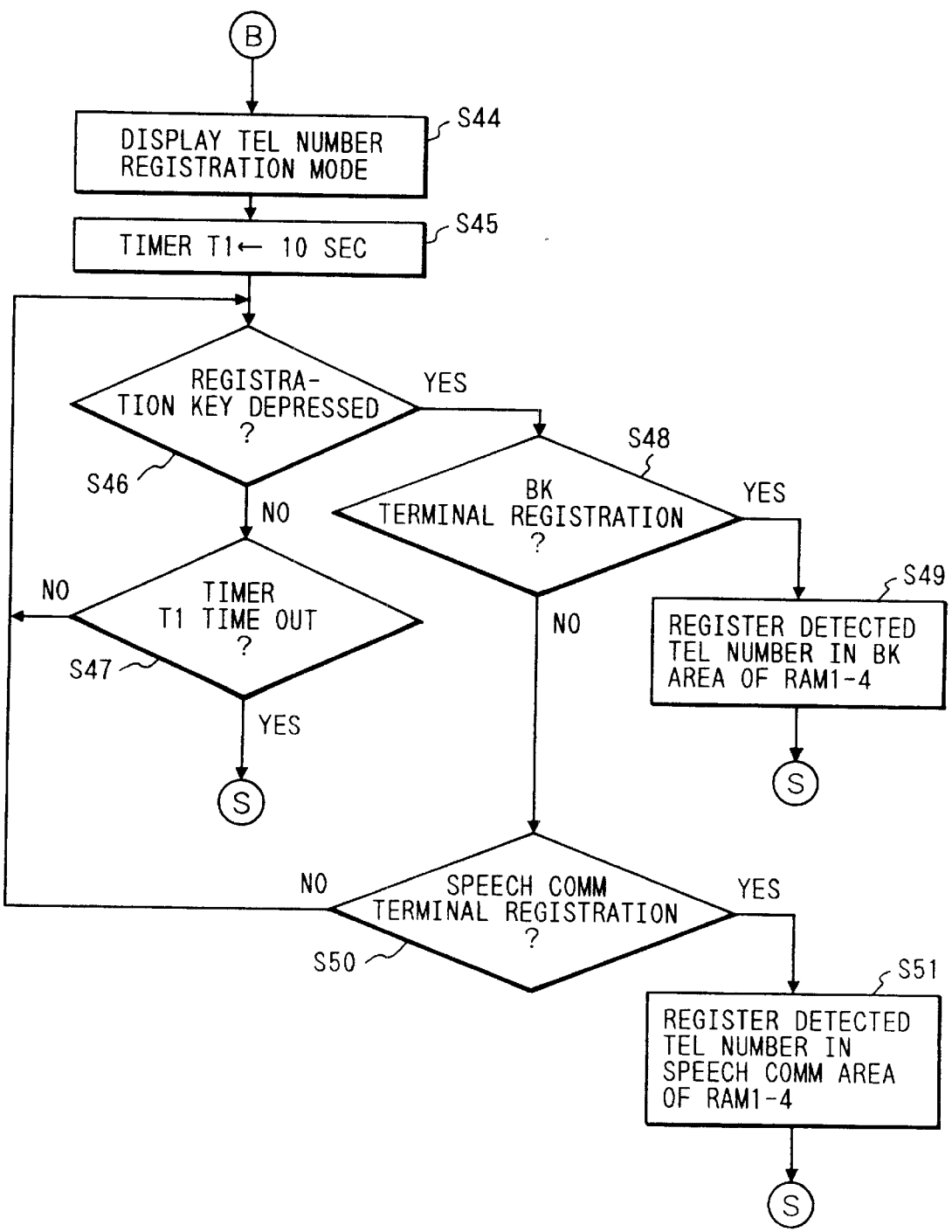
FIG. 8 is a flow chart showing the control operation of the CPU 1-1 in another aspect of the embodiment.

This operation is executed in place of steps S7, S8, S12, and S15 in the above-mentioned flow charts shown in FIGS. 3 and 4. The CPU 1-1 of this communication apparatus receives telephone number data of a calling party from the line and temporarily stores the telephone number data in the RAM 1-3 in steps S5 and S6. above. Thereafter, the flow advances to step S101. In step S101, the CPU 1-1 sends a telephone number comparison command to the DTE, and repeats the operations in steps S101 and S102 until it receives an acknowledge signal (ACK signal) from the DTE in step S102.

If the ACK signal is received in step S102, the CPU 1-1 sends the telephone number data of the calling party, which is temporarily stored in the RAM 1-3, to the DTE in step S103, and receives a response.

If it is determined in step S104 that the response is BK (the telephone number compared by the PC is registered as that of a BK terminal), the operations in step S9 and subsequent steps are performed. If it is determined in step S105 that the response is RXOK (the telephone number compared by the PC is registered as that of a facsimile (or data) communication permissible terminal), the operations in step S13 and subsequent steps are performed. If it is determined in step S106 that the response is SPOK (the telephone number compared by the PC is registered as that of a speech communication permissible terminal), the operations in step S16 and subsequent steps are performed. If it is determined in step S107 that the response is NOTHING (thee telephone number is not registered), the operations in step S18 and subsequent steps are performed. If NO is determined in these steps, an error process is performed.

The registration operation of the telephone number of a calling party will be described below with reference to the flow chart shown in FIG. 10.

In step S111, the CPU 1-1 sends a telephone number registration command to the DTE, and repetitively executes steps S111 and S112 until it receives an ACK signal from the DTE in step S112.

If the ACK signal is received from the DTE in step S112, the flow advances to step S113. In step S113, the telephone number data of the calling party, which is temporarily stored in the RAM 1-3, and data indicating one, designated via the console unit 1-5, of the BK terminal, facsimile (or data), communication permissible terminal, and speech communication permissible terminal registration modes are transferred. to the DTE, and the telephone number of the calling party is stored in a corresponding one of BK terminal, facsimile (or data) communication permissible terminal, and speech communication permissible terminal registration areas of the DTE (the same areas as in FIG. 11 are allocated on a large-capacity storage unit of the DTE).

The CPU 1-1 repetitively executes steps S113 and S114, until it receives an ACK signal indicating that the DTE has received the telephone number data of the calling party. Upon reception of the ACK signal, the flow ends.

In the above-mentioned embodiment, after the end of a non-registered facsimile or speech communication, the process as to whether or not the telephone number of a calling party of the facsimile or speech communication is registered is performed. In the case of the speech communication, since an operator is present at the position of the communication apparatus, he or she can perform the registration process immediately after the speech communication. However, in the case of the facsimile reception or the message recording operation using the auto answer/record telephone function, an operator is not always present at the position of the communication apparatus. In order to solve this problem, the RAM 1-4 stores communication management information for, e.g., last 40 communications (not limited to 40 communications), as shown in FIG. 13.

Figure 14:
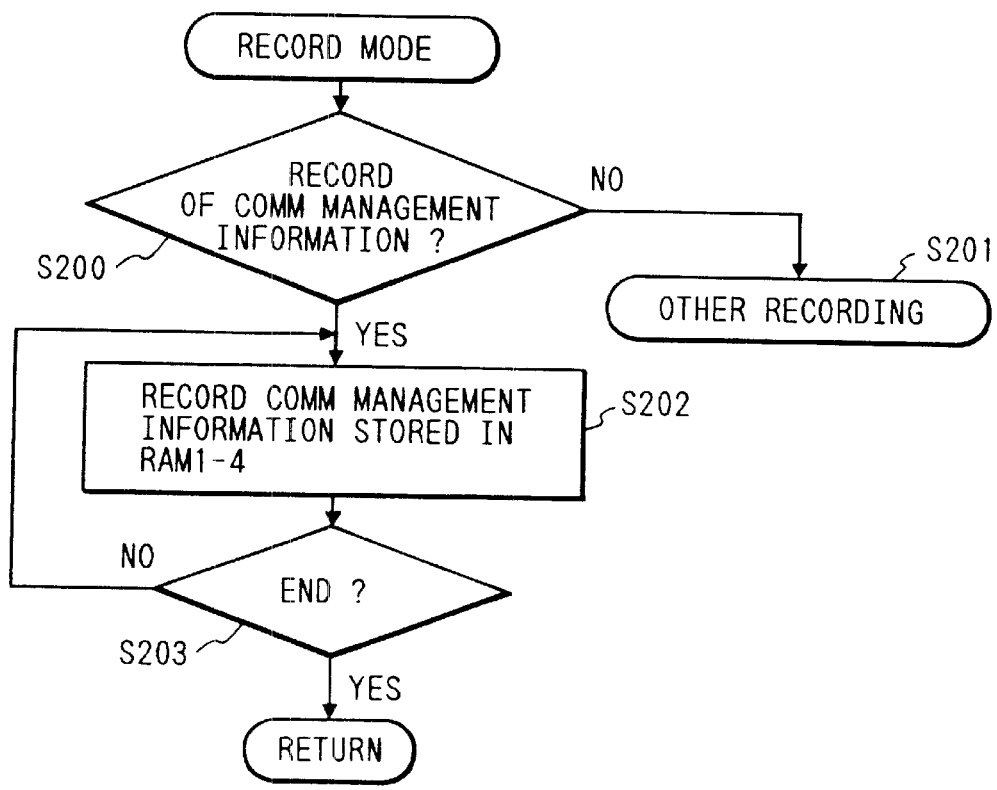
FIG. 14 is a flow chart showing the control operation of a recording mode process of the CPU 1-1.
Figure 15:
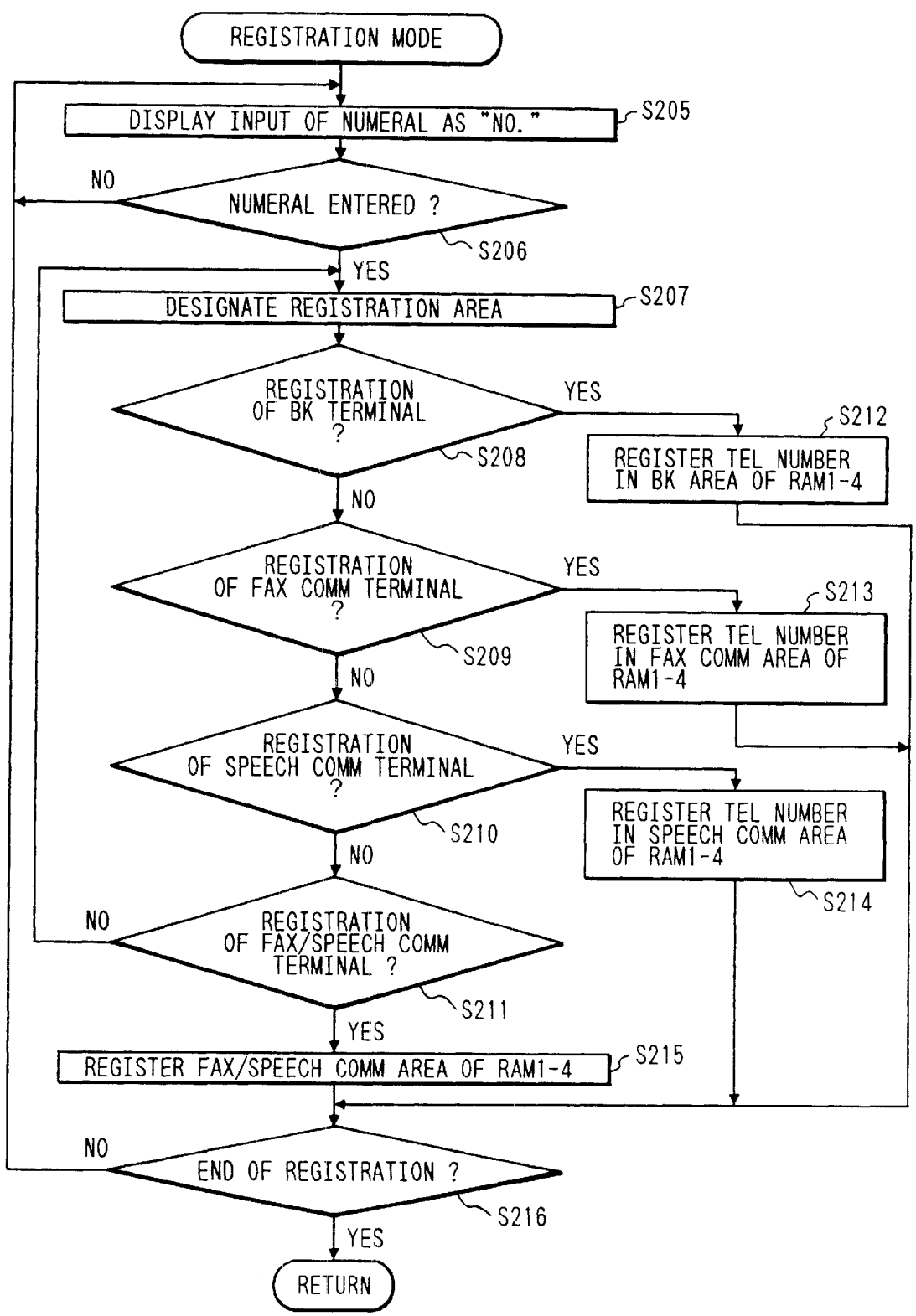
FIG. 15 is a flow chart showing the control operation of a telephone number registration mode process of the CPU 1-1.

The communication registration information includes information such as serial numbers from 1 to 40, the presence/absence of registration, the telephone numbers of calling parties received from the exchange, the communication contents (one of "rejected", "facsimile reception", "speech communication", and "auto-ans/rec"), communication dates and times, and the like. When a record mode is selected via the console unit 1-5, the communication management information stored in the RAM 1-4 is recorded by the record unit 1-9 as a report in accordance with the-flow chart shown in FIG. 14 (S200, S202, S203). Note that the report may be displayed on the display unit in place of being recorded. An operator performs the registration operation while observing the output report. FIG. 15 is a flow- chart showing the control operation of the registration mode. An operator designates one of Nos. 1 to 40 in FIG. 13 (S205, S206), and one of the BK terminal area (1-4-1 in FIG. 11), the facsimile (or data) communication permissible terminal area (1-4-2 or 1-4-4 in FIG. 11), and the speech communication permissible terminal area (1-4-3 or 1-4-4 in FIG. 11) in which the-telephone number is to be stored (S207 to S211). The CPU 1-1 stores the received telephone number data, which is stored in correspondence with the designated No. of the communication management information area in the RAM 1-4 in the designated registration area (S212 to S215).

With the above-mentioned processes, the registration-process can be achieved by simple operations, i.e., designation of an identification number corresponding to each telephone number and designation of a registration area. In the above-mentioned embodiment, since information indicating whether or not telephone number data has already been registered in the registration list in FIG. 11 (the presence/absence of registration) is stored, an operator can easily identify a non-registered telephone number. However, the CPU 1-1 may check if the telephone number which is designated to be registered has already been registered, and if the telephone number has already been registered, the CPU- 1-1 may inform a message indicating this to an operator using the display unit.

In the flow charts shown in FIGS. 3 to 8, information of facsimile/speech communication terminal telephone numbers in the registration area 1-4-4 in FIG. 11 is not used. However, some terminals of calling parties may use a single telephone line (subscriber line) commonly to both speech and facsimile communications, and whether a speech or facsimile communication is to be performed upon call reception is often unknown. Thus, when a call is received from a terminal corresponding to the telephone number registered in the area 1-4-4 in FIG. 11 (when telephone number data sent from the exchange is registered in the area 1-4-4 in FIG. 11), the FAX/TEL auto select mode process (S22 to S29 in FIG. 5) is performed even when the FAX/TEL auto select mode is not selected. Thus, even when an operator forgets to set the apparatus in the FAX/TEL auto select mode, a speech communication or facsimile reception can be appropriately selected.

According to the above-mentioned processes, when the registered telephone number of a partner station is compared with telephone number data received from the exchange, and a communication process is performed based on the comparison result, since the telephone number data sent from the exchange is directly used as the registered telephone number, 1. comparison data need not be processed at all upon comparison of the telephone numbers, and 2. the telephone numbers can be reliably compared with each other.

Since the data terminal such as a PC connected to the communication apparatus of the present invention is used as a registration source of telephone number data to be compared with the received telephone number data, comparison data can be increased nearly infinitely regardless of the memory capacity of the communication apparatus.

Second Embodiment

In the above embodiment, a telephone number is registered by a manual operation of an operator. However, the registration process may be automatically performed in place of the manual operation of the operator. The automatic registration process will be explained below as the second embodiment.

Figures 16, 16A:
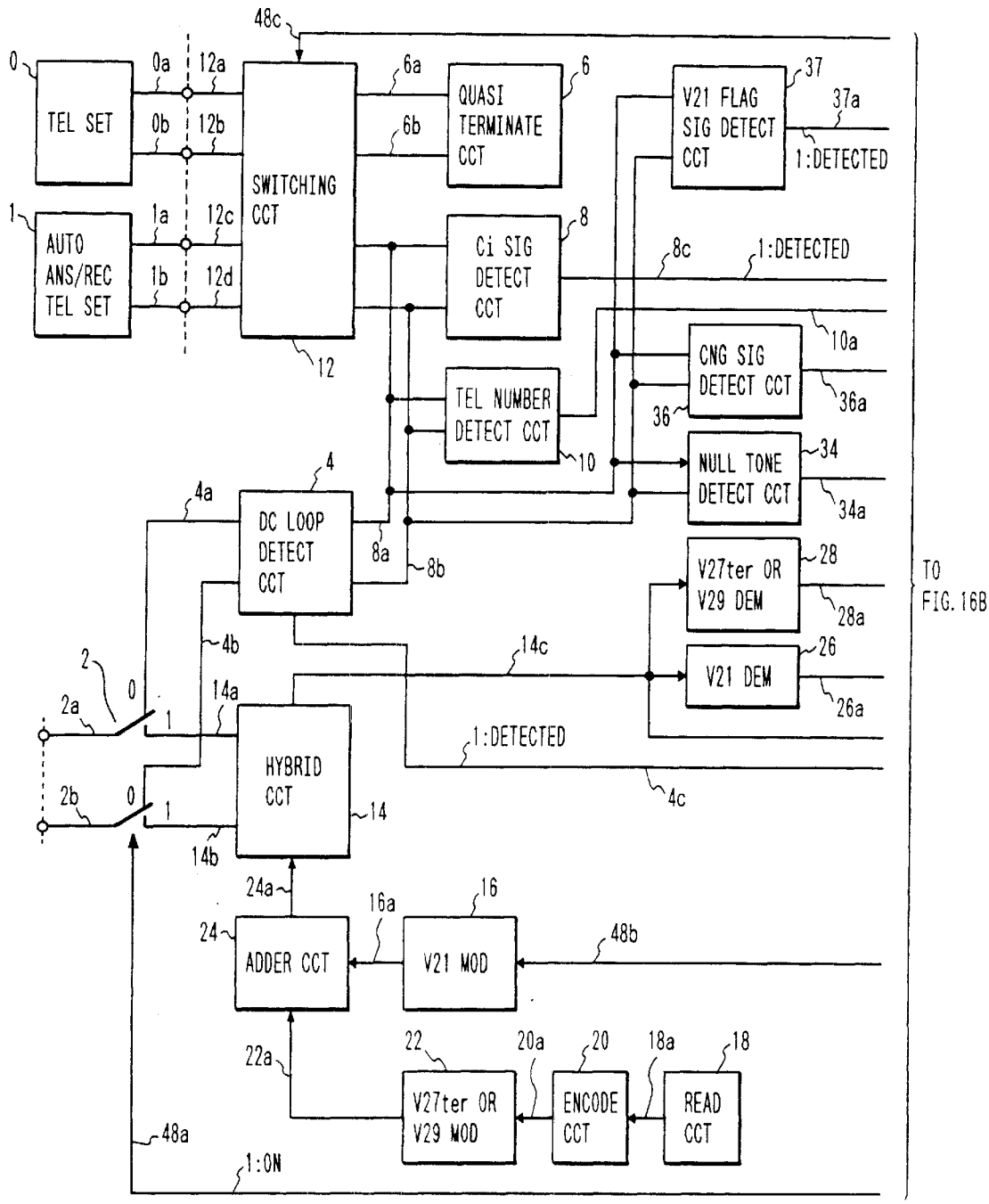
FIG. 16, consisting of FIGS. 16A and 16B, is showing a block diagram showing the arrangement of a facsimile apparatus according to the second embodiment.

FIGS. 16A and 16B are combined as shown in FIG. 16 and show a block diagram representing the arrangement of a facsimile apparatus of the second embodiment.

A telephone set 0 and an auto answer/record telephone set 1 are connected to connection terminals of the facsimile apparatus. More specifically, the telephone set 0 is connected to the connection terminal of the facsimile apparatus via signal lines 0a and 0b, and the auto answer/record telephone set 1 is connected to the connection terminal of the facsimile apparatus via signal lines 1a and 1b.

Blocks 2 to 48 to be described below are respectively components of the facsimile apparatus.

A CML relay 2 is kept OFF when a signal of signal level "0" is output onto a signal line 48a. In this state, the telephone line is connected to signal lines 2a and 2b via terminals, and the signal lines 2a and 2b are connected to signal lines 4a and 4b. The CML relay 2 is turned on when a signal of signal level "1" is output onto the signal line 48a. In this state, the signal lines 2a and 2b are connected to signal lines 14a and 14b.

A DC loop detect circuit 4 detects whether or not the signal lines 4a and 4b are respectively connected to signal lines 8a and 8b, and an external terminal connected to the signal lines 8a and 8b detects a DC loop. When the DC loop is not detected, the circuit 4 outputs. a signal of signal level "0" onto a signal line 4c; otherwise, it outputs a signal of signal level "1" onto the signal line 4c.

A quasi terminate circuit 6 connects the signal lines 8a and 8b via signal lines 6a and 6b to prevent the exchange from determining that no terminal is connected due to too high an impedance when non-ringing call reception is performed without connecting the signal lines 8a and 8b to the telephone set 0 or the auto answer/record telephone set 1 in a state wherein the DC loop is not detected.

A calling (Ci) signal detect circuit 8 receives signals output on the signal lines 8a and 8b, and when the circuit 8 detects a Ci signal, it outputs a signal of signal level "1" onto a signal line 8c; otherwise, it outputs a signal of signal level "0" onto the signal line 8c.

A telephone number detect circuit 10 detects telephone number data, which is sent from a calling party between adjacent Ci signals. The circuit 10 receives signals output on the signal lines 8a and 8b, and outputs detected telephone number data onto a signal line 10a.

A switching circuit 12 connects the signal lines 8a and 8b to the signal lines 6a and 6b when a signal "0" is output onto a signal line 48c; or similarly connects the signal lines 8a and 8b to signal lines 12a and 12b or 12c and 12d when a signal "1" or "2" is output onto the signal line 48c.

A hybrid circuit 14 separates signals of the transmission and:reception systems from each other. More specifically, a transmission signal on a signal line 24a is output onto the telephone line via the signal lines 14a and 14b and the CML relay 2. On the other hand, a signal sent from a partner station is output onto a signal line 14c via the CML relay 2 and the signal lines 14a and 14b.

A modulator 16 performs modulation on the basis of the ITU-T recommendation V.21. The modulator 16 modulates a procedure signal received from a signal line 48b, and outputs the modulated data onto a signal line 16a.

A read circuit 18 comprises an image pickup element such as a CCD (charge coupled device), and an optical system. The read circuit 18 sequentially reads image signals each for one main scanning line from an original to be transmitted, and generates a signal train representing two values, i.e., black and white. The binary signal train representing black and white is output onto a signal line 18a.

An encode circuit 20 receives read data output on the signal line 18a, and outputs encoded data (by MH or MR encoding) onto a signal line 20a.

A modulator 22 performs modulation based on the ITU-T recommendation V.27ter (differential phase modulation) or V.29 (quadrature modulation). The modulator 22 modulates a signal received from the signal line 20a, and outputs the modulated data onto a signal line 22a.

An adder circuit 24 adds signals received from the signal lines 16a and 22a, and outputs the sum onto a. signal line 24a.

A demodulator 26 performs demodulation based on the ITU-T recommendation V.21. The demodulator 26 performs V.21 demodulation of a signal received from the-signal line 14c, and outputs the demodulated data onto a signal line 26a.

A demodulator 28 performs demodulation based on the ITU-T recommendation V.27ter (differential phase modulation) or V.29 (quadrature modulation). The demodulator 28 demodulates a signal received from the signal line 14c, and outputs the demodulated data onto a signal line 28a.

A decode circuit 30 receives a signal output on the signal line 28a, and outputs decoded data (by MH or MR decoding) onto a signal line 30a.

A record circuit 32 receives data output on the signal line 30a, and sequentially records the data line by line.

A null tone detect circuit 34 receives signals output on the signal lines 8a and 8b, and when the circuit 34 detects a null tone state, it outputs a signal of signal level "1" onto a signal line 34a; otherwise, it outputs a signal of signal level "0" onto the signal line 34a.

A CNG signal detect circuit 36 receives signals output on the signal lines 8a and 8b, and detects a CNG signal. When the circuit 36 detects a CNG signal, it outputs a signal of signal level "1" onto a signal line 36a; otherwise, it outputs a signal of signal level "0" onto the signal line 36a.

A V.21 flag signal detect circuit 37 receives signals output on the signal lines 8a and 8b, and detects a V.21 flag signal. When the circuit 37 detects a V.21 flag signal, it outputs a signal of signal level "1" onto a signal line 37a; otherwise, it outputs a signal of signal level "0" onto the signal line 37a.

A null tone detect circuit 50, a CNG signal detect circuit 52, and a V.21 flag signal detect circuit 54 are the same as the above-mentioned detect circuits 34, 36, and 37, and perform the corresponding detections based on a signal received from the signal line 14c (signal detection in a state wherein the DC loop is detected by the facsimile apparatus) in place of signals received from the signal lines 8a and 8b (signal detection in a state wherein the DC loop is not detected by the facsimile apparatus). The detection outputs. of these circuits 50, 52, and 54 are respectively output onto signal lines 50a, 52a, and 54a. More specifically, each of these circuits outputs a signal of signal level "1" in a detection state, and outputs a signal of signal level "0" in a non-detection state.

A call receive mode select button 38 is used for selecting one of an auto-receive mode, a manual-receive mode, an auto answer/record telephone direct connection mode, and a FAX/TEL auto select mode. Upon depression of this button 38, a depression pulse is generated on a signal line 38a.

A call receive mode display circuit 40 displays a call receive mode. When a clear pulse is generated on a signal line 48d, the circuit 40 displays an "auto-receive mode", and thereafter, every time a depression pulse is generated on the signal line 38a, the circuit 40 displays "auto-receive mode"→"manual-receive mode"→"auto answer/record telephone. direct connection mode"→"FAX/TEL auto select mode"→"auto-receive mode" in turn. When the call receive mode display circuit 40 displays the "auto-receive mode", it outputs a signal "0" onto a signal line 40a; when the circuit 40 displays the "manual-receive mode", "auto answer/record telephone direct connection mode", or "FAX/TEL auto select mode", it outputs a signal "1", "2", or "3" onto the signal line 40a.

A registration circuit 42 registers telephone number data of a partner station as a facsimile communication terminal via a signal line 42a.

A registration circuit 44 registers telephone number data of a partner station as a speech communication terminal via a signal line 44a.

A console unit 46 has a button used for registering a telephone number in the registration circuit 42, a button used-for registering a telephone number in the registration circuit 44, one-touch dial buttons, abbreviated dial buttons, a start button, a ten-key-pad, and other function buttons. Data of each of the depressed buttons is output onto a signal line 46a.

A control circuit 48 controls the entire facsimile apparatus of this embodiment, and comprises a microcomputer, a ROM, a RAM, and the like. In this embodiment, the control circuit 48 performs the following control operations.

First, the control circuit 48 stores the type (a speech or facsimile communication terminal) of a terminal of a calling party in the registration circuit 42 or 44. When the call receive mode is the auto answer/record telephone direct connection mode,. upon detection of a Ci signal, the control circuit 48 checks telephone number data output between adjacent Ci signals while outputting the Ci signals to an auto answer/record telephone direct connection terminal. In this, case, when it is determined that the terminal of the calling party is a facsimile communication terminal, the control circuit 48 starts facsimile reception. However, when it is determined that the terminal of the calling party is a speech communication terminal, the control circuit 48 directly operates the auto answer/record telephone set without starting facsimile reception. On the other hand, when it is not certain if the terminal of the calling party is a facsimile or speech communication terminal, the control circuit 48 checks a CNG signal, a V.21 flag signal, and a null tone for a predetermined period of time after the DC loop of the auto answer/record telephone set 1 is closed. When one of these signals is detected, the control circuit 48 starts facsimile reception; when none of these signals are detected,. the. control circuit 48 directly operates the auto answer/record telephone set without starting facsimile reception. When it is surely determined that the terminal of the calling party is a speech or facsimile communication terminal, the control circuit 48 stores the type of the terminal in the registration circuit 42 or 44 in correspondence with the telephone number data.

Figure 17:
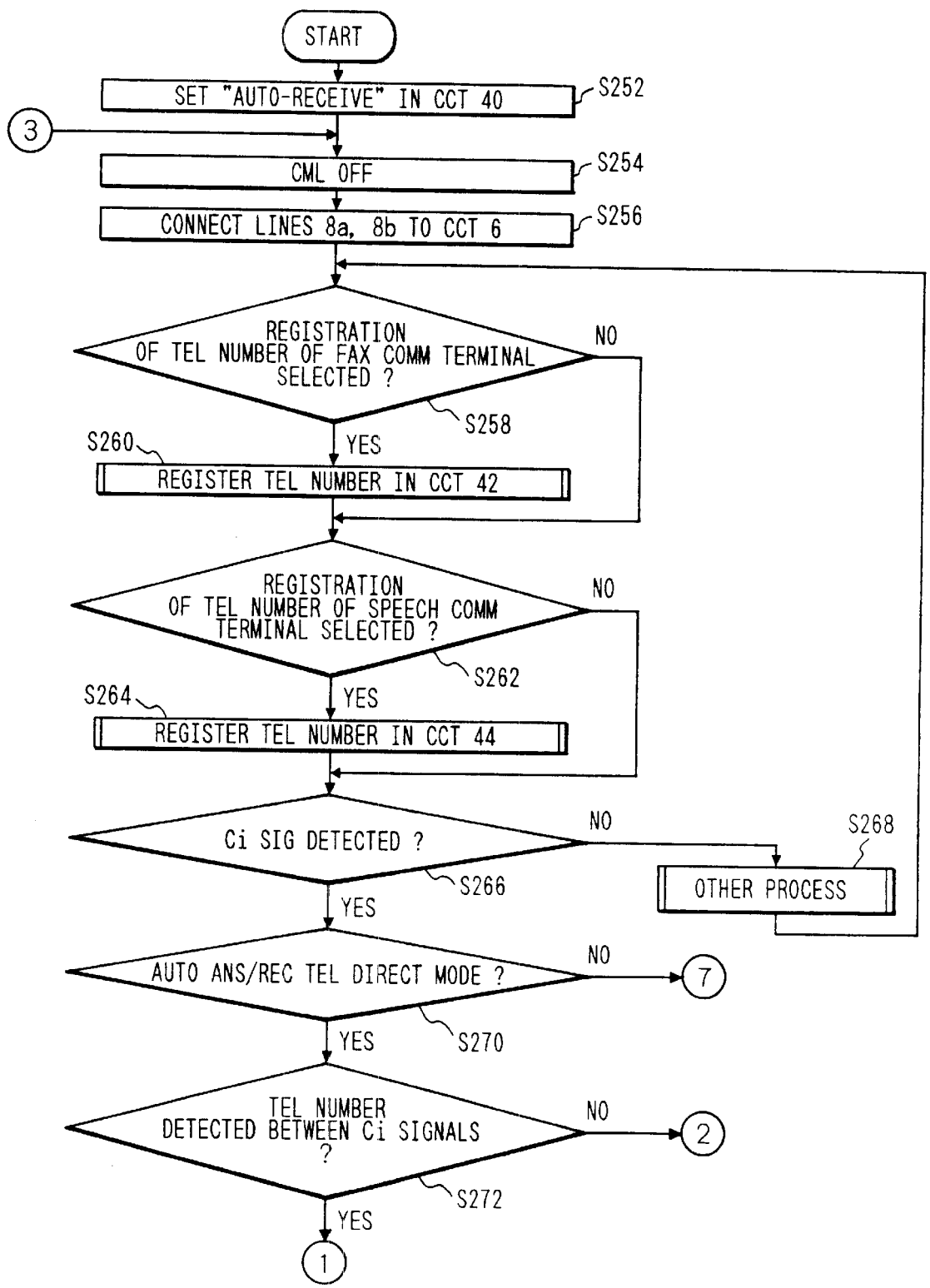
FIG. 17 is a flow chart showing the operation in the second embodiment.
Figure 18B:
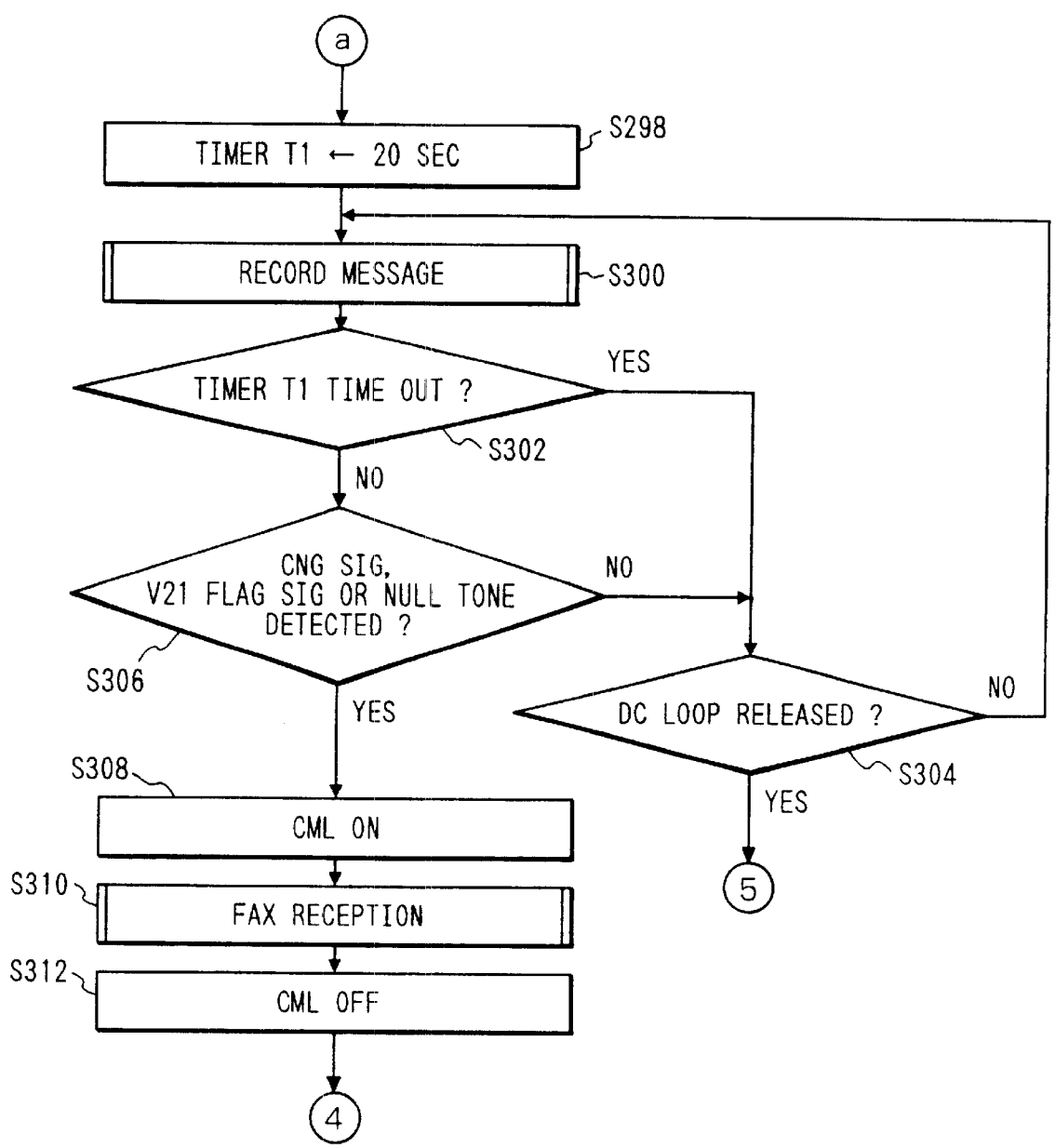
FIG. 18, consisting of FIGS. 18A and 18B, is showing a flow chart showing the operation in the second embodiment.
Figure 19:
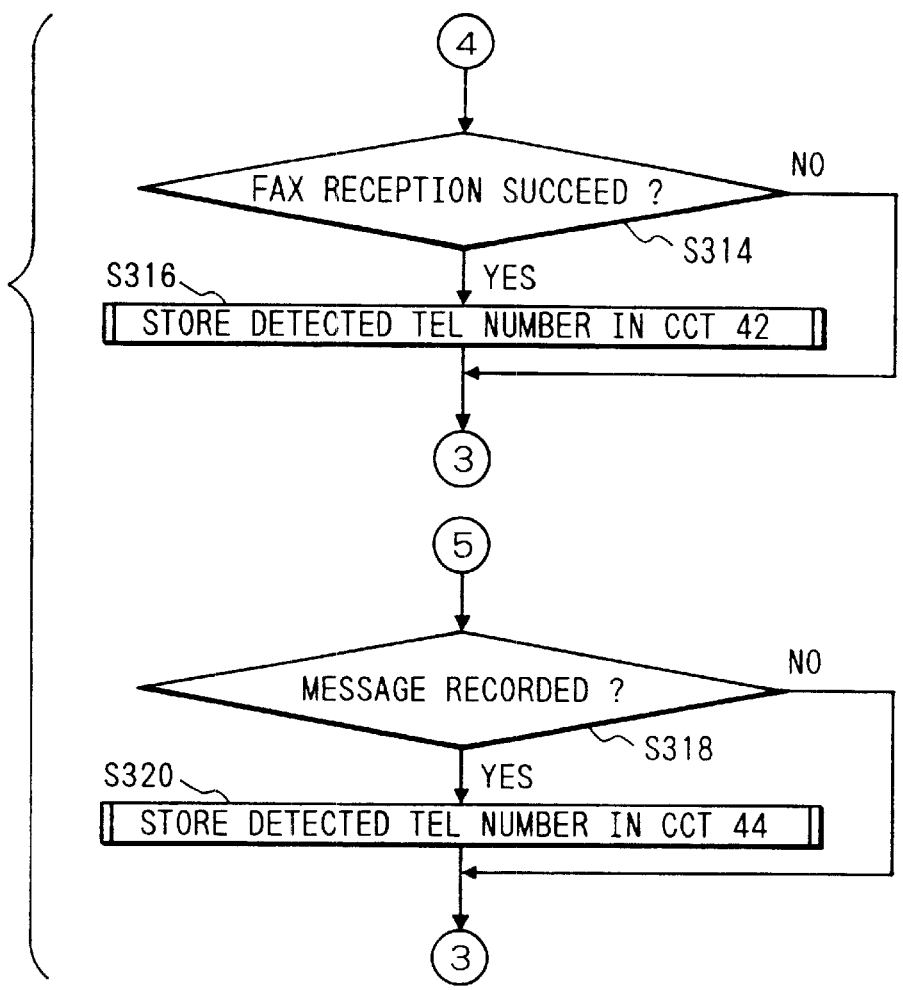
FIG. 19 is a flow chart showing the operation in the second embodiment.

FIGS. 17 to 19 are flow charts showing the operation of the control circuit 48 in this embodiment.

In step S252, a clear pulse is generated onto the signal-line 48d to control the call receive mode display-circuit 40 to display "auto receive". In step S254, a signal of signal level "0" is output onto the signal line 48a to turn off the CML relay.

In step S256, a signal "0" is output onto the signal line 48c to connect the signal lines 8a and 8b to the quasi terminate circuit 6 (signal lines 6a and 6b).

In step S258, data on the signal line 46a is received to check if the registration mode of the telephone number of a calling party corresponding to a facsimile communication terminal is selected. If YES in step S258, the flow advances to step S260 to register the telephone number in the registration circuit 42. Note that this registration operation is attained as follows. That is, upon depression of the above-mentioned button used for registering a telephone, number in the registration circuit 42, the registration mode of the telephone number of a calling party corresponding to a facsimile communication terminal is started, and a telephone number to be registered is input using the ten-key pad. The control circuit 48 registers the input telephone number in the registration circuit 42 as that of a calling party corresponding to a facsimile. communication terminal.

On the other hand, if this registration mode is not selected, the flow advances to step S262. In step S262, data on the signal line 46a is received to check if a registration mode of the telephone number of a calling party corresponding to a speech communication terminal is selected. If YES in step S262, the flow advances to step S264, and the telephone number is registered in the registration circuit 44. Note that this registration operation is attained as follows. That is, upon depression of the above-mentioned button used for registering a telephone number in the registration circuit 44, the registration mode of the telephone number of a calling party corresponding to a speech communication terminal is started, and a telephone number to be registered is input using the ten-key pad. The control circuit 48 registers the input telephone number in the registration circuit 44 as that of a calling party corresponding to a speech communication terminal.

On the other hand, if this registration mode is not selected, the flow advances to step S266. In step S266, data on the signal line 8c is received to check if a Ci signal is detected. If NO in step S266, the flow advances to step S268 to execute other processes.

Figures 20, 20A:
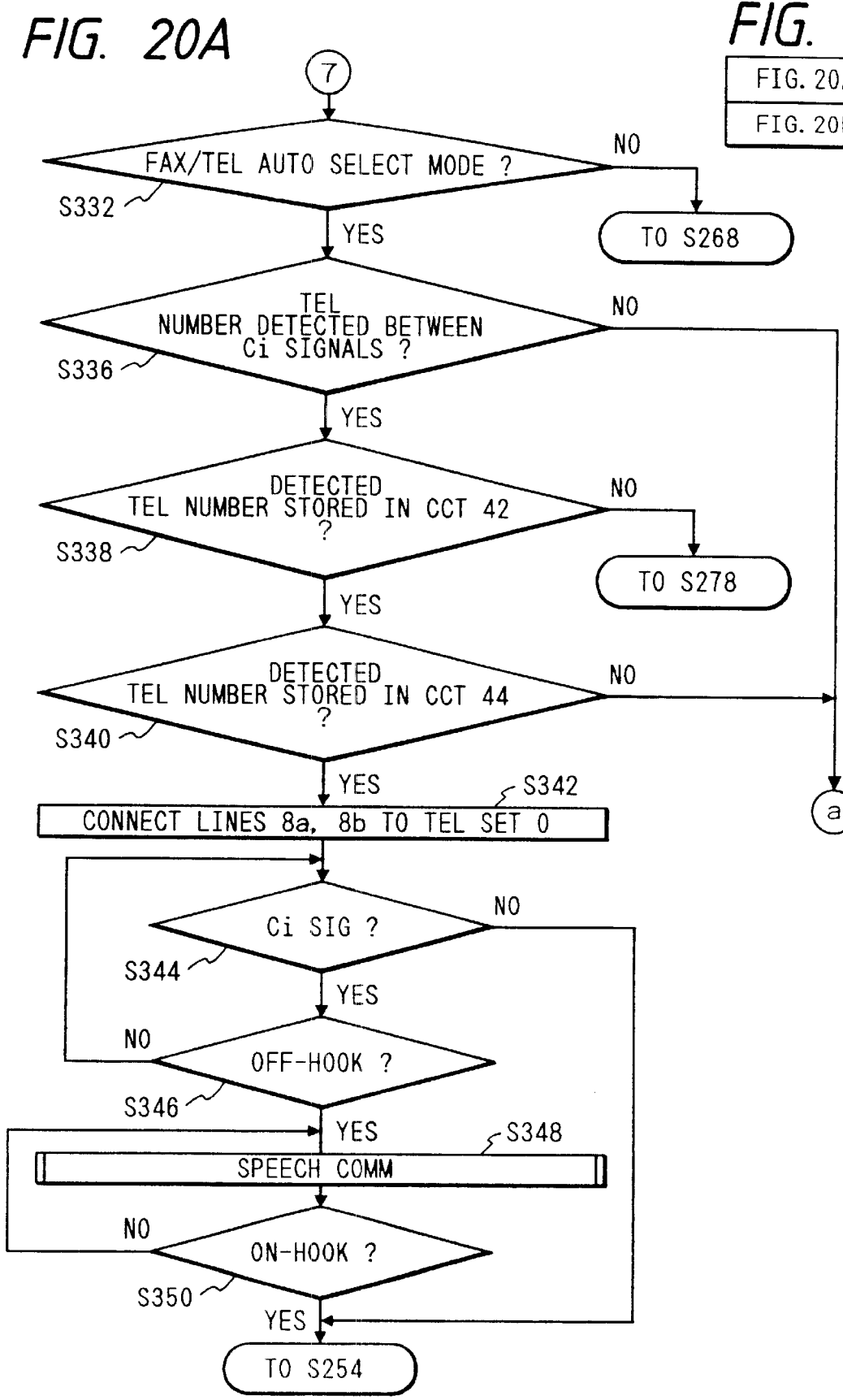
FIG. 20, consisting of FIGS. 20A and 20B, is showing a flow chart showing the operation in the second embodiment.

However, if YES in step S266, the flow advances to step S270 to receive data on the signal line 40a. If the data on the signal line 40a indicates the auto answer/record telephone direct connection mode, the flow advances to step S272; otherwise, the flow advances to step S332 (FIG. 20A).

In step S272, data on the signal line 10a is received to check if telephone number data between adjacent Ci signals is detected. If YES in step S272, the flow advances to step S276; otherwise, the flow advances to step S274.

In step S274, a signal "2" is output onto the signal line 48c to connect the signal lines 8a and 8b to the-signal lines 12c and 12d, i.e., to the auto answer/record telephone set 1. With this operation, the Ci signal is supplied to the auto answer/record telephone set 1.

In step S276, it is checked if the telephone number data between adjacent Ci signals is already registered in the registration circuit 42, i.e., if a terminal corresponding to the telephone number data is a facsimile communication terminal. If YES in step S276, the flow advances to step S278. In step S278, a signal of signal level "1" is output onto the signal line 48a to turn on the CML relay, and facsimile reception is started without supplying Ci signals to the auto answer/record telephone set 1 or the telephone set 0 (S280).

However, if NO in step S276, the flow advances to step S281, and a signal "2" is output onto the signal line 48c to connect the signal lines 8a and 8b to the signal lines 12c and 12d, i.e., to the auto answer/record telephone set 1. In this manner, the Ci signals are applied to the auto answer/record telephone set 1.

In step S282, it is checked if the telephone number data between adjacent Ci signals is registered in the registration circuit 44, i.e., if a terminal corresponding to the telephone number is a speech communication terminal. If YES in step S282, the flow advances to step S284; otherwise, the flow advances to step S294.

In step S284, since the terminal of the calling party is a speech communication terminal, it is important and effective not to start facsimile reception, i.e., it is important and effective to start the auto answer/record telephone mode without detecting a CNG signal, V.21 flag signal, and null tone for a predetermined period of time.

In step S286, data on the signal line 8c is received to check if a Ci signal is detected. If YES in step S286, the flow advances to step S288; otherwise, the flow returns to step S254 above, i.e., to an initial state.

In step S288, data on the signal line 4c is received to check if the auto answer/record telephone set 1 detects a DC loop, i.e., if the telephone set 1 answers. If NO in step S288, the flow returns to step S286.

However, if YES in step S288, the flow advances to step S290 to perform auto message recording by means of the auto answer/record telephone set 1. In step S292, data on the signal line 4c is received to check if the auto answer/record telephone set 1 releases the DC loop, i.e., the telephone set 1 completes auto message recording. If YES in step S292, the flow returns to step S254, i.e., to an initial state; otherwise, the flow returns to step S290.

On the other hand, in step S294, data on the signal line 8c is received to check if a Ci signal is detected. If YES in step S294, the flow advances to step S296; otherwise, the flow returns to step S254, i.e., to an initial state.

In step S296, data on the signal line 4c is received to check if the auto answer/record telephone set 1 detects a DC loop, i.e., the telephone set 1 answers. If NO in step S296, the flow returns to step S294. If YES in step S296, the flow advances to step S298 to detect a CNG signal, V.21 flag signal, and null tone for a predetermined period of time. In this case, 20 seconds are set in a timer T1 as the predetermined period of time.

In step S300, auto message recording is performed. by the auto answer/record telephone set 1. In step S302, it is-checked if the timer T1 has reached a time-out state. If YES in step S302, the flow advances to step. S304; otherwise, the flow advances to step S306.

In step S304, data on the signal line 4c is received to check if the auto answer/record telephone set 1 releases a DC loop, i.e., the telephone set 1 completes auto message recording. If YES in step S304, the flow advances to step S318; otherwise, the flow returns to step S300.

In step S306, data on the signal lines 34a, 36a, and 37a are received to check if a CNG signal, V.21 flag signal, or null tone is detected. If one of these signals is detected, the flow advances to step S308 to start facsimile reception; if none of these signals are detected, the flow returns to step S304.

In step S308, a signal of signal level "1" is output onto the signal line 48a to turn on the CML relay. In step S310, facsimile reception is performed.

In step S312, a signal of signal level "0" is output onto the signal line 48a to turn off the CML relay. In step S314, it is checked if the apparatus has successfully completed facsimile reception. If YES in step S314, since it can be reliably determined that the partner station is a facsimile communication terminal, the flow advances to step S316. When telephone number data is detected between adjacent Ci signals, the telephone number data is registered in the registration circuit 42 in step S316. However, if NO. in step S314, the flow returns to step S254, i.e., to an initial state.

In step S318, it is checked if the auto message recording is actually performed, e.g., if the auto message recording state has continued for a predetermined period of time or more. If YES in step S318, since it can be reliably determined that the partner station corresponds to a speech communication terminal,. the flow advances to step S320. When telephone number data is detected between adjacent Ci signals, the telephone number data is registered in the registration circuit 44 in. step S320. However, if NO in step S318, the flow returns to step S254, i.e., to an initial state.

The FAX/TEL auto select mode will be described below.

In this case, non-ringing call reception is performed, and telephone number data sent between adjacent Ci signals is checked. If the terminal. of the calling party corresponds to a facsimile communication terminal, facsimile reception is started in the non-ringing state. If it is not determined that the terminal of the calling party corresponds to a facsimile or speech communication terminal, a facsimile. communication-unit is temporarily enabled to check a CNG signal, V.21 flag signal, and null tone for a predetermined period of time after line seizure. When one of these signals is detected, facsimile reception is started; when none of these signals are detected, an operator call is made without starting facsimile reception. If it is reliably determined that the terminal. of the calling party corresponds to a facsimile or speech communication terminal, the type of terminal,. i.e., a speech or facsimile communication terminal. is, stored in the circuit 42 or 44 in correspondence with the telephone number data sent between adjacent Ci signals.

Figure 21:
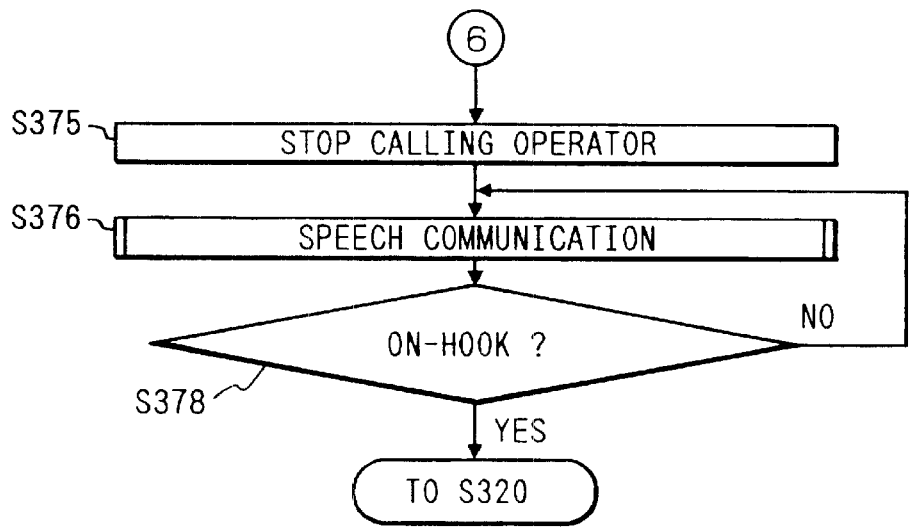
FIG. 21 is a flow chart showing the operation in the second embodiment.
Figure 20B:
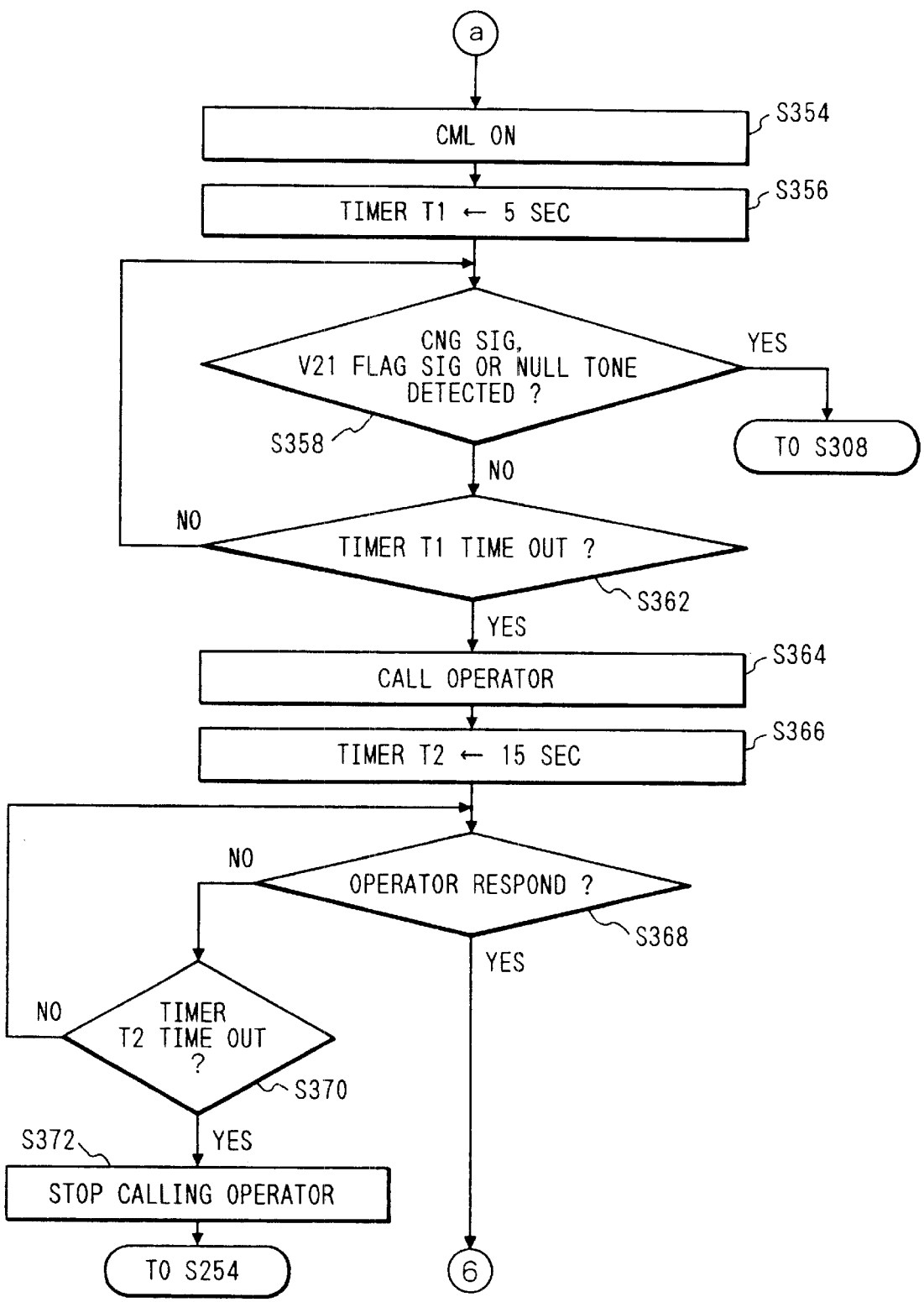

FIGS. 20A, 20B combined as shown in FIG. 20 and FIG. 21 are flow charts showing the control in the FAX/TEL auto select mode.

When the flow advances from step S270 in FIG. 17 to step S332 in FIG. 20A, data on the signal line 40a is received in step S332. to check if the FAX/TEL auto select mode is selected. If NO in step S332, the flow advances to step S268 in FIG. 17. On the other hand, if YES in step S332, the flow advances to step S336 to perform the same process as in step S272 in FIG. 17. If it is determined in step S336 that telephone number data is detected between two adjacent Ci signals, the flow advances to step S338; otherwise, the flow advances to step S354.

In step S338, the same process as in step S276 in FIG. 18A is performed. If it is determined in step S338 that the telephone number data between adjacent Ci signals corresponds to a facsimile communication terminal, the flow advances to step S278; otherwise, the flow advances to step S340.

In step S340, the same process as in step S282 in FIG. 18A is performed. If it is determined in step S340 that the telephone number data between adjacent Ci signals corresponds to a speech communication terminal, the. flow advances to step S342; otherwise, the flow advances to step S354.

In step S342, a signal "1" is output onto the signal line 48c to connect the signal lines 8a and 8b to the telephone set 0, thus causing the telephone set 0 to generate ringing tones in response to Ci signals. In step S344, by the same process as in step S286 in FIG. 18A, it is checked if a Ci signal is detected. If YES in step S344, the flow advances to step S346; otherwise, the flow advances to step S352.

In step S346, data on the signal line 4c is received to check if the telephone set 0 is set in an off-hook state. If NO in step S346, the flow returns to step S344 to continue detection of the Ci signal. However, if YES in step S346, the flow advances to step S348 to perform. a speech communication. Thereafter, in step S350, data on the signal line 4c is received to check if the telephone set 0 is set in an on-hook states If NO in step S350, the flow returns to step S348 to-continue the speech communication. On the other hand, if YES in step S350, the flow returns to step S254 in FIG. 17, i.e., to an initial state.

In step S354, a signal of signal level "1" is output onto the signal line 48a to turn on the CML relay. In step S356, 5 seconds are set. in the timer T1 for detecting a CNG signal, V.21 flag signal, or null tone.

In step S358, data on the signal lines 50a, 52a, and 54a are received to check if the CNG signal, V.21 flag signal, or null tone is detected. If at least one of these signals is detected, the flow advances to step S308 in FIG. 18B to start facsimile reception.

However, if none of these signals are detected, the flow advances to step S362. It is checked-in step S362 if the timer T1 has reached a time-out state. If NO in step S362, the flow returns to step S358 to continue detection. However, if YES in step S362, the flow advances to step S364 to control a circuit (not shown) to generate an operator call tone, thus. calling an operator.

In step S366, 15 seconds are set in a timer T2 for an operator call. In step S368, it is checked if an operator responds, i.e., if the telephone set 0 is set in an off-hook state. If YES in step S368, the flow advances to step S375; otherwise, the flow advances to step S370.

In step S370, it is checked if the timer T2 has reached a time-out state. If NO in step S370, the flow returns to step S368 to wait for the response of an operator. However, if YES in step S370, the flow advances to step S372 to stop the operator call started in step S364, and the flow returns to step S254 in FIG. 17, i.e., to an initial state.

In step S375, the operator-call started in step S364 is stopped. In step S376, a speech communication is started. It is checked in step S378 if the operator sets the handset (telephone set 0) in an on-hook state. If YES in step S378, the flow advances to step S320 in FIG. 19 to register telephone number data between adjacent Ci signals in the registration circuit 44. On the other hand, if NO in step S378, the speech communication is continued in step S376, The auto-receive mode will be described below.

In this case, non-ringing call reception is performed, and telephone number data sent between adjacent Ci signals is checked. If the terminal of a calling party corresponds to a speech communication terminal, a Ci signal is output to the terminal of the telephone set; otherwise, control for performing auto call reception and facsimile reception is executed. If a facsimile reception is actually performed, the type of terminal, i.e., a facsimile communication terminal, is stored in correspondence with telephone number data sent between adjacent Ci signals. With this operation, a facsimile communication from this partner station can be reliably performed.

Figure 22:
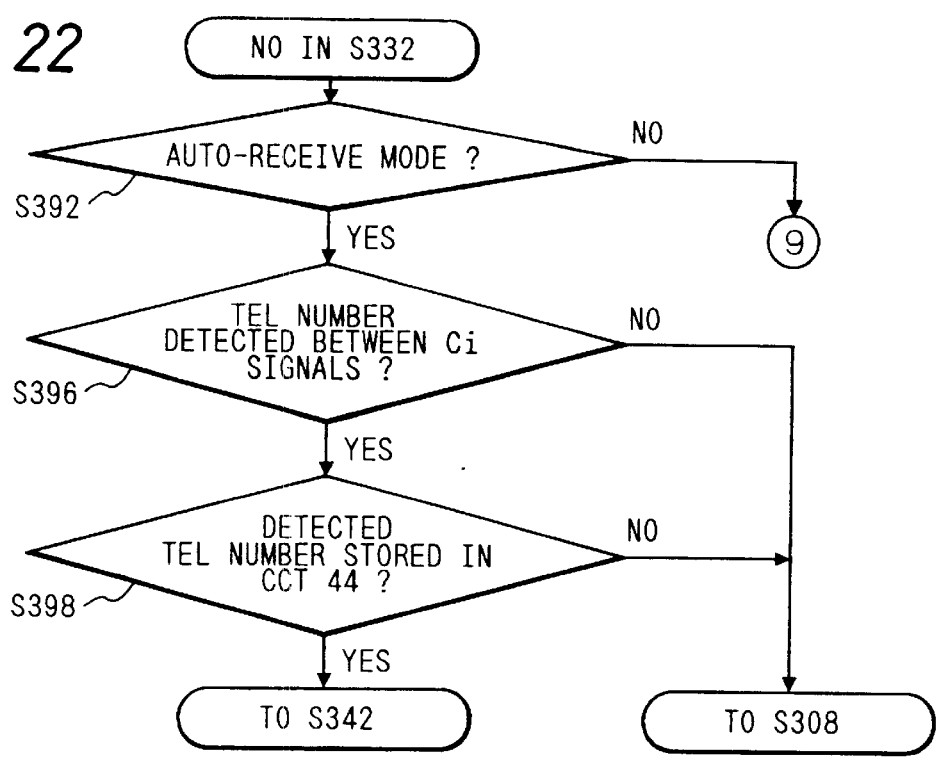
FIG. 22 is a flow chart showing the operation in the second embodiment.

FIG. 22 is a flow chart showing the control in the auto-receive mode.

Figure 23:
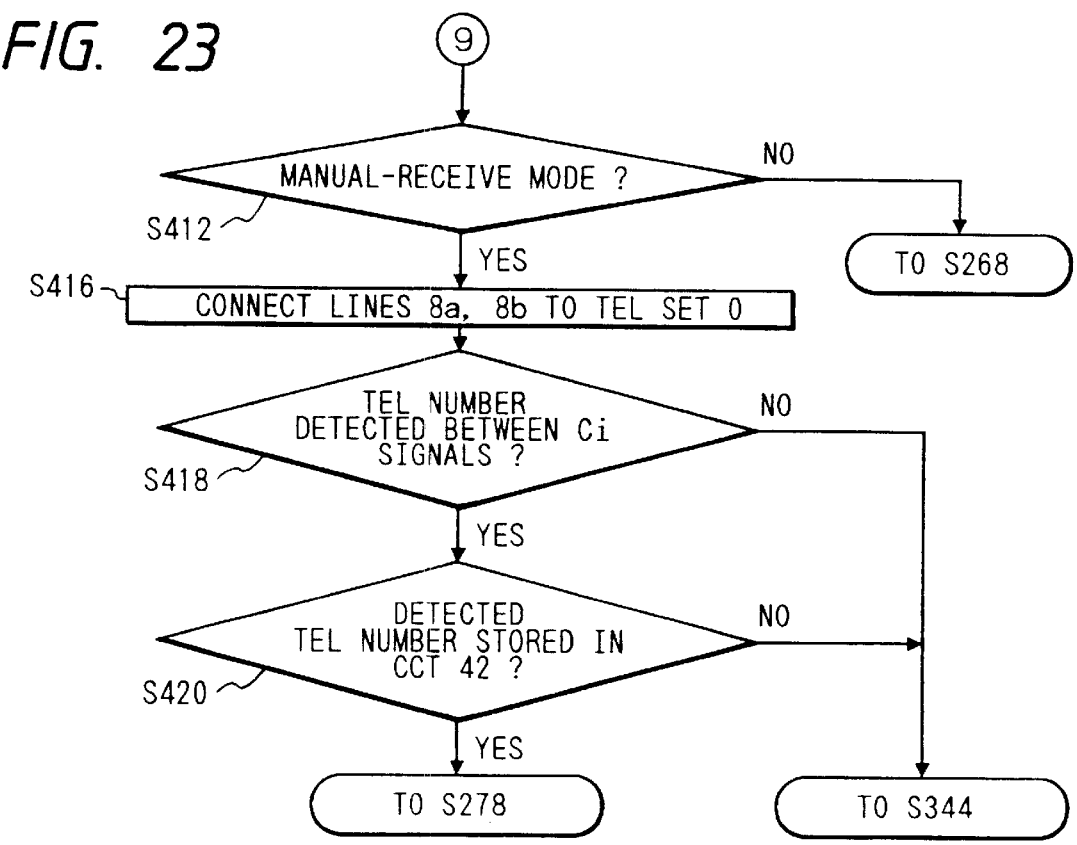
FIG. 23 is a flow chart showing the operation in the second embodiment.

If NO is determined in step S332 in FIG. 20A, the flow advances. to step S392 in FIG. 22. In step S392, data on the signal line 40a is received to check if the. auto-receive mode is selected. If YES in step S392, the flow advances to step S396; otherwise, the flow advances. to step S412 (FIG. 23).

In step S396, the same process as in. step S272 in FIG. 17 is performed. If it is determined. in step S396 that telephone number data is detected between adjacent Ci signals, the flow advances to step S398; otherwise, the flow advances to step S308 in FIG. 18B.

In step S398, the same process as in step S282 in FIG. 18A is performed. If it is determined in step.

S398 that the telephone number data between adjacent Ci signals corresponds to a speech communication terminal, the flow advances to step S342 in FIG. 20A;. otherwise, the flow advances to step S308 in FIG. 18B.

The manual-receive mode will be described below.

In this case, telephone number data sent between adjacent Ci signals is checked while outputting a Ci signal to the terminal of the telephone set, and if it is determined that the calling party corresponds to a facsimile communication terminal, facsimile reception is started.

FIG. 23 is a flow chart showing the control in the manual-receive mode.

If NO is determined. in step S392 in FIG. 22, the flow advances to step S412 in FIG. 23. In step S412, data on the signal line 40a is received to check if the manual-receive mode is selected. If NO in step S412, the flow advances-to step S268. However, if YES in step S412, the flow advances to step S416, and a signal "1" is output onto the signal line 48c to connect the signal lines 8a and-8b to the telephone set 0.

In step S418, the same process as in step S272 is performed. If it is determined in step S418 that telephone number data between adjacent Ci signals is not detected, the flow advances to step S344. However, if it is determined in step S418 that telephone number data between adjacent Ci signals is detected, the flow advances to step S420 to perform the same process as in step S276. If it is determined in step S420 that the telephone number data between adjacent Ci signals corresponds to a speech communication terminal, the flow advances to step S278; if it is determined in step S4207 that the telephone number data between adjacent C4 signals: corresponds to a facsimile communication terminal, the flow advances to step S344.

As described above, according to the second embodiment, in the auto answer/record telephone direct connection mode, telephone number data between adjacent Ci signals is detected, and if the calling party corresponds to a facsimile communication terminal, facsimile reception can be started without starting the auto answer/record telephone set. On the other hand, if the calling party corresponds to a speech. communication terminal, a CNG signal, V.21 flag signal, or null tone is detected after the auto answer/record telephone set closes a DC loop, thus preventing facsimile reception from being erroneously started due to a detection error.

In the FAX/TEL auto select mode, telephone number data between adjacent Ci signals is detected, and if the calling party corresponds to a facsimile communication terminal, facsimile reception can be started in a non-ringing mode. Even when the calling party performs manual transmission, a communication mode can be started.

Third Embodiment

Processes executed when the telephone number of a single partner station is registered in both the registration circuits 42 and 44 for facsimile and speech communications will be explained below as the third embodiment.

Figures 24, 24A:
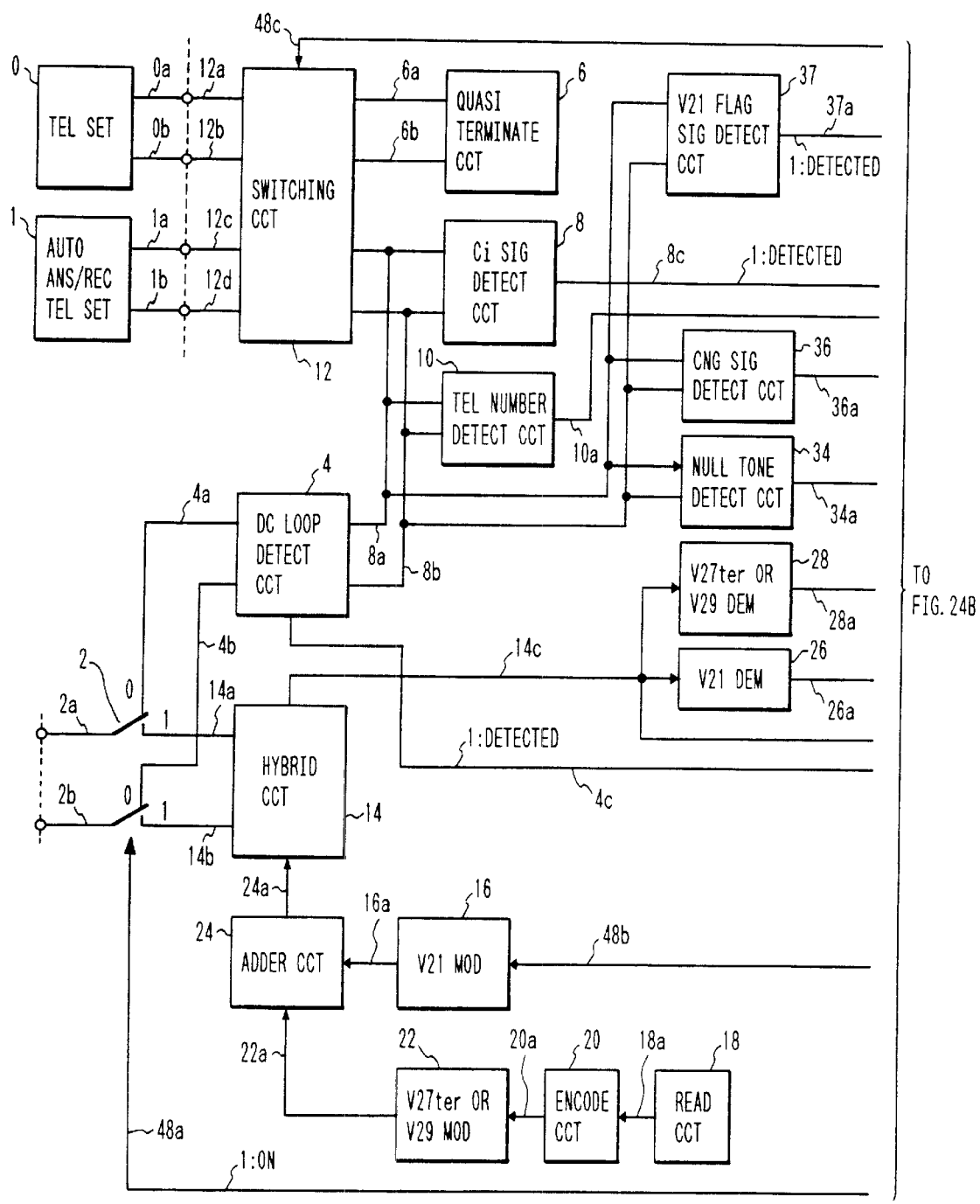
FIG. 24, consisting of FIGS. 24A and 24B, is a showing block diagram showing the arrangement of a facsimile apparatus according to the third embodiment.
Figure 24B:
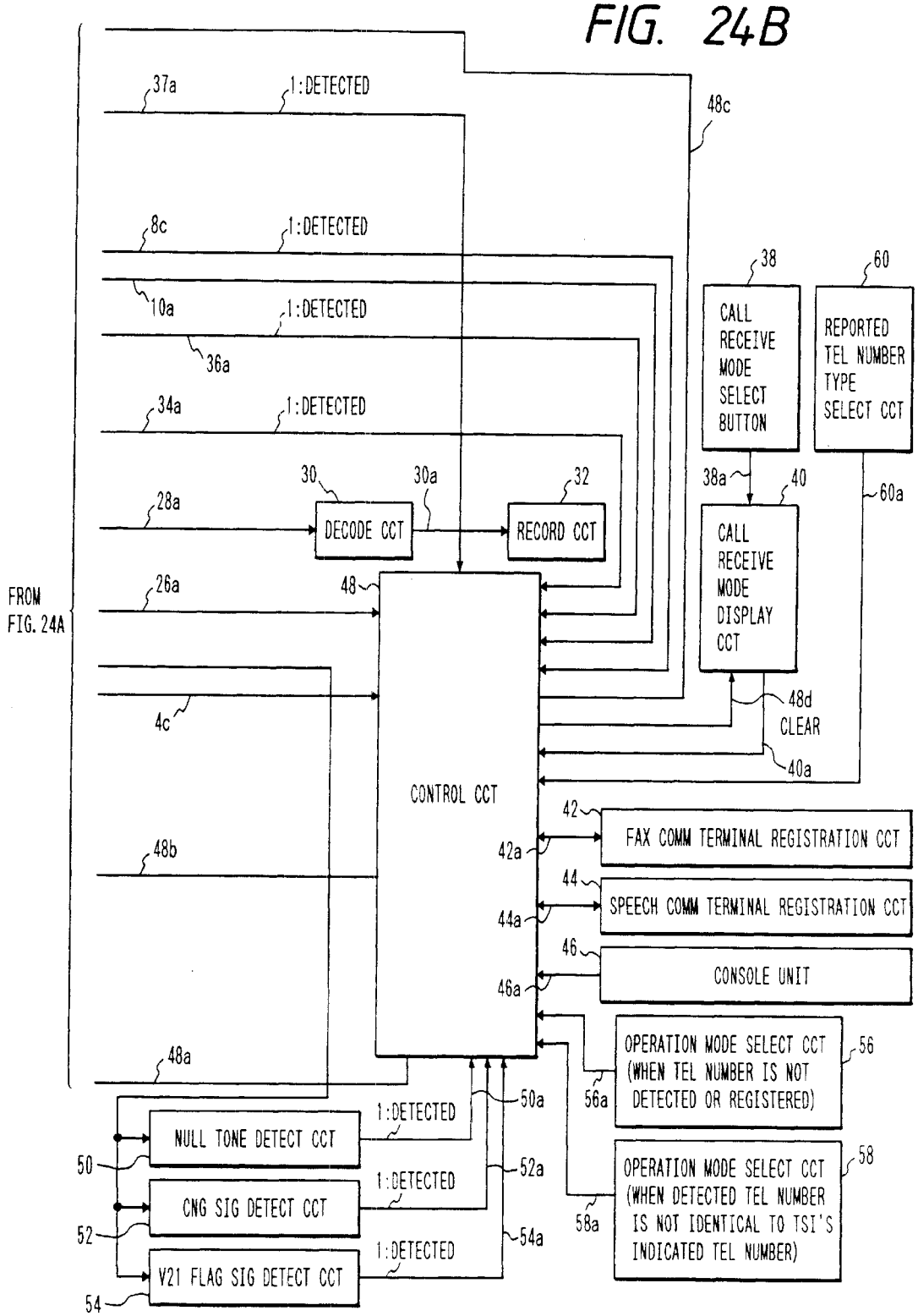
Figure 25:
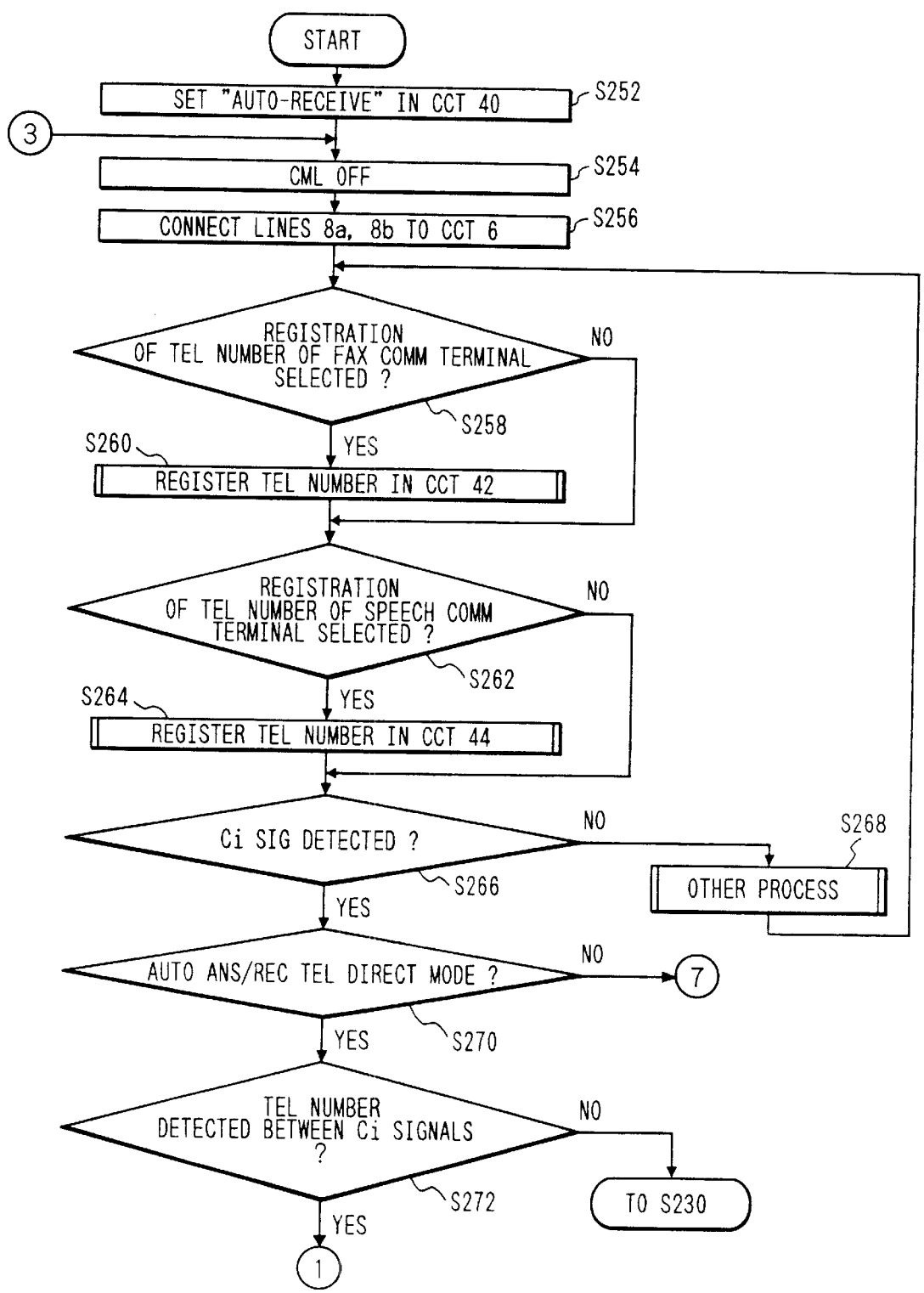
FIG. 25 is a flow chart showing the operation in the third embodiment.
Figure 26B:
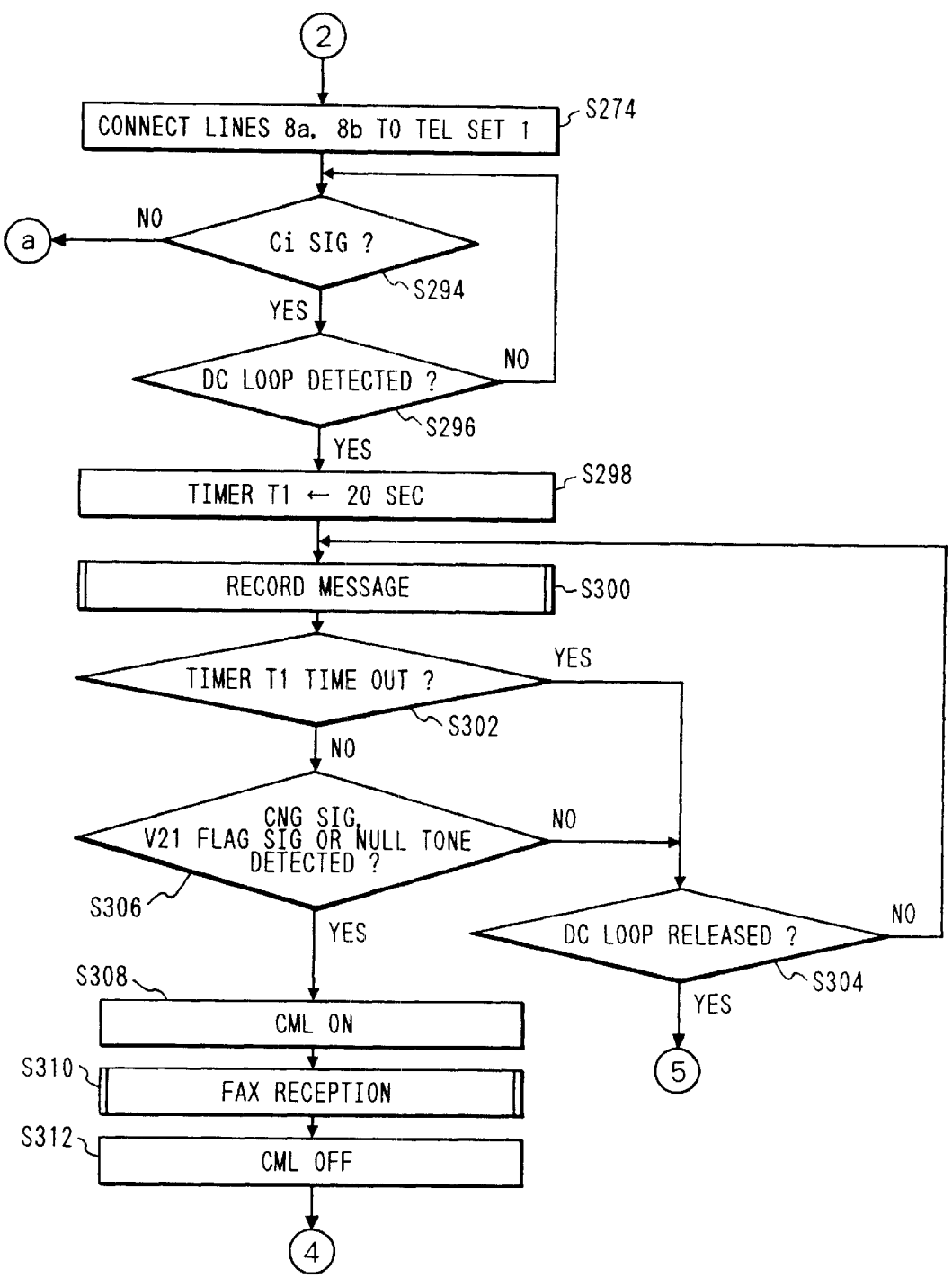
FIG. 26, consisting of FIGS. 26A and 26B, is showing a flow chart showing the operation in the third embodiment.
Figure 27:
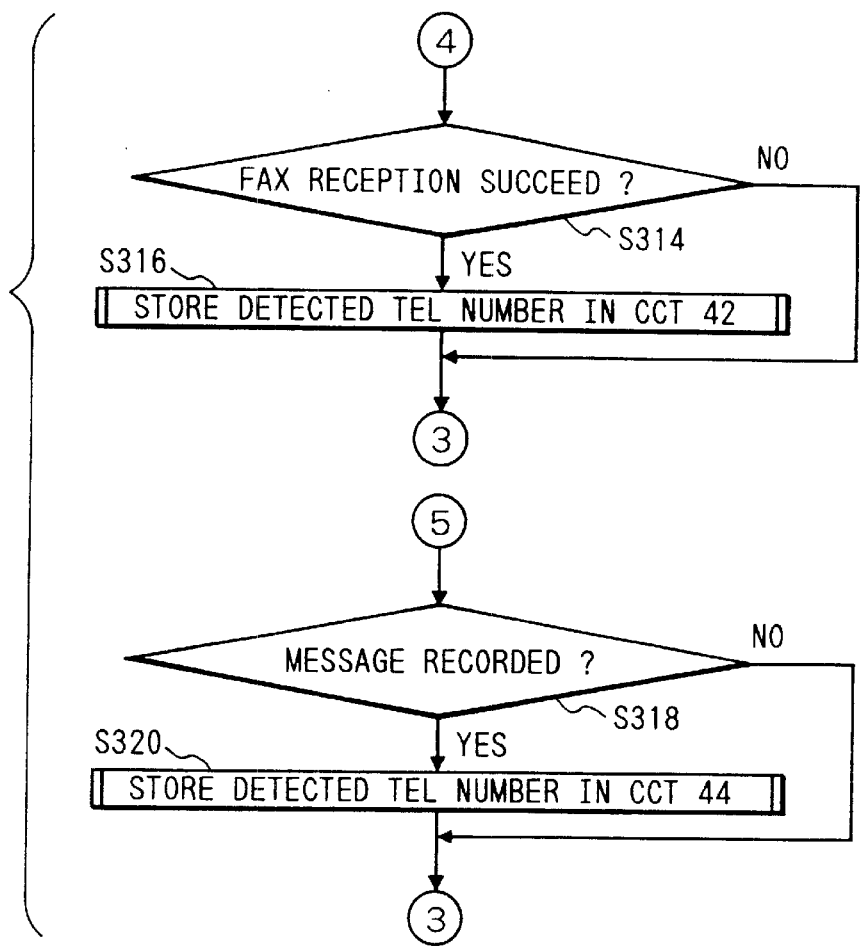
FIG. 27 is a flow chart showing the operation in the third embodiment.
Figure 29:
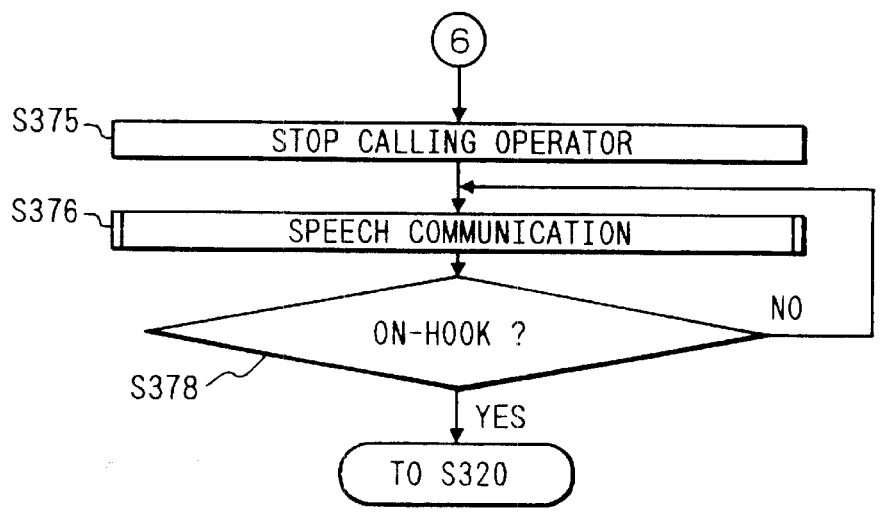
FIG. 29 is a flow chart. showing the operation in the third embodiment.

FIGS. 24A and 24B are combined as shown in FIG. 24 and show a block diagram representing the arrangement of a facsimile apparatus according to the third embodiment. In FIGS. 24A and 24B, since blocks denoted by the same reference numerals as in FIGS. 16A and 16B are the same circuits or units, a detailed description thereof will be omitted. In FIG. 24B, select circuits 56, 58, and 60 are added.

The select circuit 56 selects an operation mode when telephone number between adjacent Ci signals is not detected or not registered. A user can select one of three operation modes, i.e., "comply with the selected receive mode", "neglect a call, and continuously ring a bell until a calling party disconnects the line", and "respond only one time upon call reception, and release the line", as operation modes performed when a call which does not include telephone number data between adjacent Ci signals or a call corresponding to non-registered telephone number data between adjacent Ci signals is received. The circuit 56 outputs the selected mode onto a signal line 56a.

The select circuit 58 selects an operation mode when telephone number between adjacent Ci signals is not identical to telephone number data indicated by TSI signal sent in a pre-procedure. The circuit 58 compares-the telephone number between adjacent Ci signals, and telephone number data (TSI data) indicated by the TSI signal, and if these two telephone numbers are not identical to each other, a user can select one of two operation modes, i.e., "preferentially use telephone number data sent between adjacent Ci signals, and continue reception" and "terminate the reception operation as a setting error". The circuit 58 outputs the selected mode onto a signal line 58a.

The select circuit 60 selects the type of telephone number data to be recorded in communication result data, and a user can select one of "telephone number data between adjacent Ci signals" and "telephone number data detected in a pre-procedure" as telephone number data to be recorded in communication result data. The circuit 60 outputs the selected type of telephone number data onto a signal line 60a.

The control circuit 48 checks telephone number data sent between adjacent Ci signals, and executes control corresponding to the selected mode of the select circuit 56 when a terminal corresponding to the detected telephone number data is not registered as speech and facsimile communication terminals, or when no telephone number data is not sent between adjacent Ci signals.

FIGS. 25 to 31 are flow charts showing the operations of the control circuit 48 in the third embodiment. In FIGS. 25 to 31, since the same step numbers as in FIGS. 17 to 22 correspond to the same processes as those described in the second embodiment, processes different from those in the second embodiment (FIGS. 17 to 23) will be described below.

If it is determined in step S282 in FIG. 26A that registration of telephone number data between adjacent Ci signals is not a singular registration in only the registration circuit 44 for speech communication terminals, the flow advances to step S583.

In step S583, the contents of the registration circuits 42 and 44 are checked to discriminate if the telephone number data between adjacent Ci signals is registered in both. the registration circuits 42 and 44, i.e., if. a terminal corresponding to the telephone. number is registered as both facsimile and speech communication terminals. If YES in step S583, the flow advances to step S274; otherwise, the flow advances to step S430.

In step S430, the operation mode selected for a case wherein the telephone number data between adjacent Ci signals is not detected or is registered in neither the circuit 42 nor the circuit 44 is checked based on data from the circuit 56 (signal line 56a). If the operation mode "comply with the receive mode" is selected, the flow advances to step S274; if the operation mode "respond only one time" is selected, the flow advances-to step S432; if the operation mode "neglect a call" is selected, the flow advances to step S438.

In step S432, a signal of signal level "1" is output onto the signal line 48a to turn on the CML relay, thus responding only one time. In step S434, the control waits for 3 seconds. Thereafter, the CML relay is turned off (S254).

In step S438, a signal on the signal line 8c is received and the control waits until no more Ci signals are detected. If no more Ci signals are detected, the flow advances to step S268.

Figure 28B:
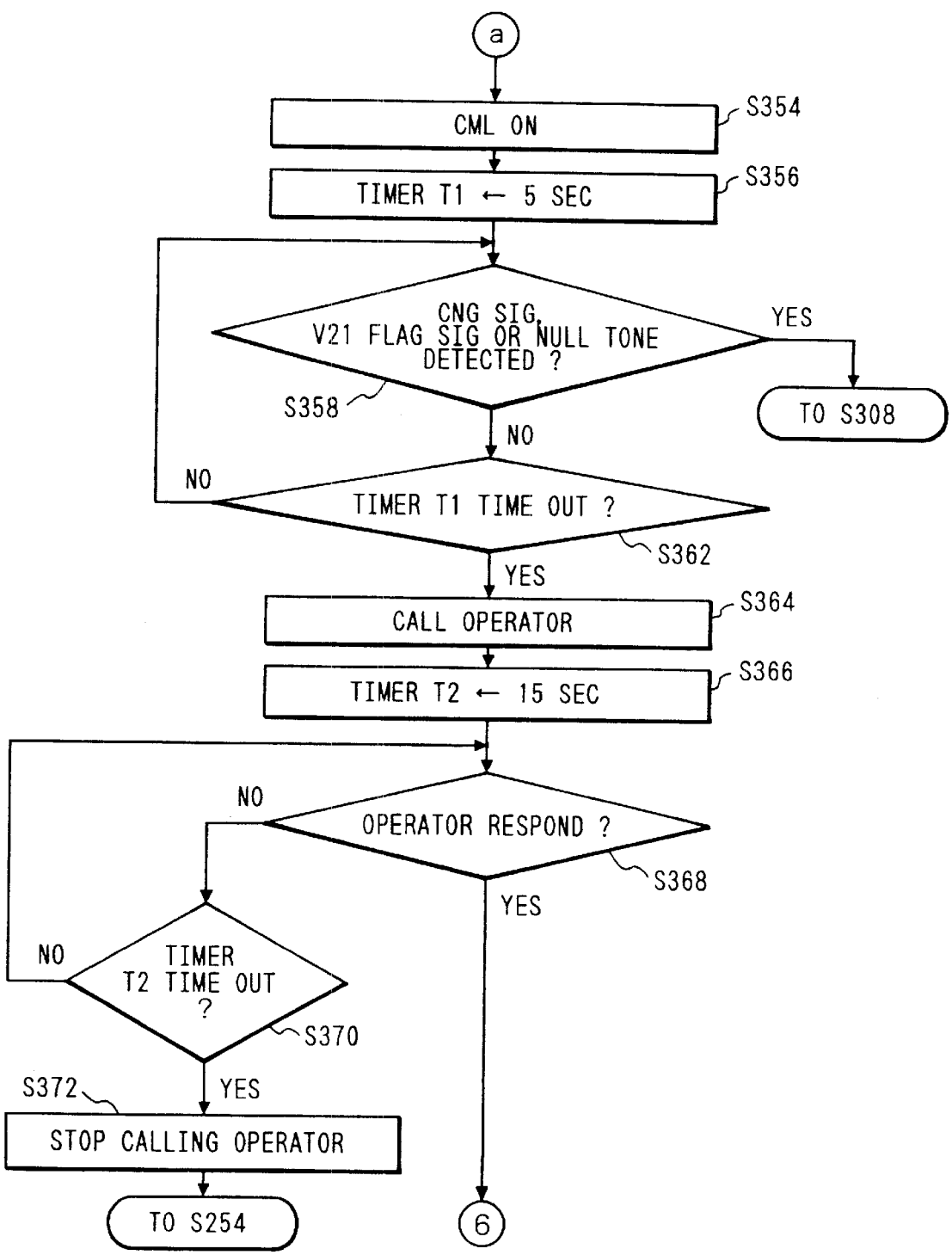
FIG. 28, consisting of FIGS. 28A and 28B, is showing a flow chart showing the operation in the third embodiment.

On the other hand, if it is determined in step S336 in FIG. 28A that telephone number data between adjacent Ci signals is not detected, the flow advances to step S444. If it is determined in step S340 that the telephone number data registration is not a singular registration in only the registration circuit 44 for speech communication terminals, it is checked in step S442 if the telephone number data is registered in both the circuits 42 and 44, as in step S583. If YES in step S442, the flow advances to step S354; otherwise, the flow advances to step S444.

In step S444, the same process as in step S430 is performed to check the circuit 56. If the operation mode "comply with the receive mode" is selected, the flow advances to step S354; if the operation mode "respond only one time" is selected, the flow advances to step S432; if the operation mode "neglect a call" is selected, the flow advances to step S438.

Figure 30:
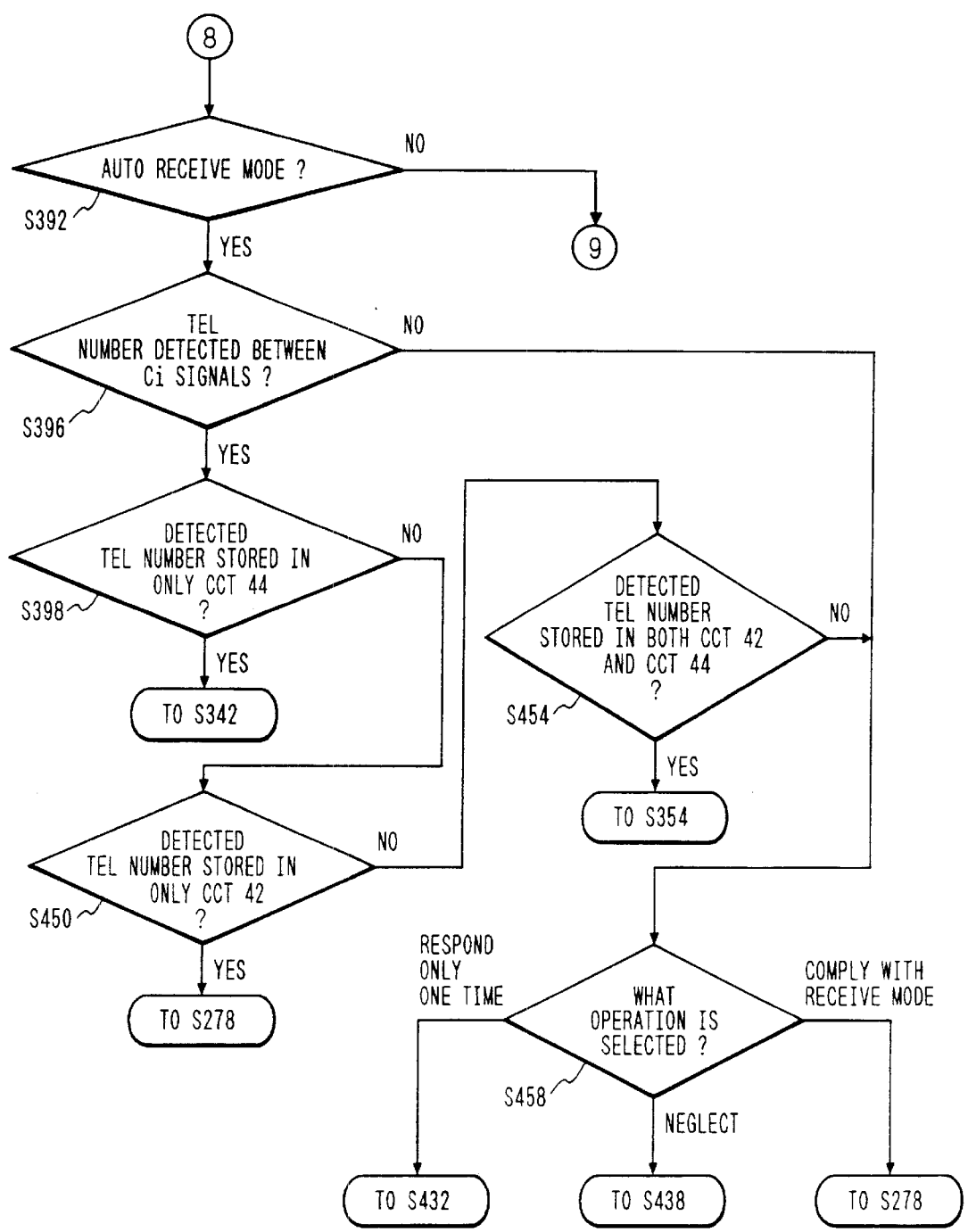
FIG. 30 is a flow chart showing the operation in the third embodiment.

If it is determined in step S396 in FIG. 30 that telephone number data between adjacent Ci signals is detected, the flow advances to step S398; otherwise, the flow advances to step S458.

If it is determined in step S398 that the telephone number data between adjacent Ci signals is registered as only a speech communication terminal, the flow advances to step S342; if it is determined in step S398 that registration of the telephone number data between adjacent Ci signals is not a singular registration only as a speech communication terminal, the flow advances to step S450.

In step S450, the same process as in step S276 is performed. If it is determined in step S450 that the telephone number data between adjacent Ci signals is registered as only a facsimile communication terminal, the flow advances to step S278; if it is determined in step S450 that registration of the telephone number data between adjacent Ci signals is not a singular registration only as a facsimile communication terminal, the flow advances to step S454.

In step S454, the same process as in step S283 is performed. If it is determined in step S454 that the telephone number data between adjacent Ci signals is registered as both facsimile and speech communication terminals, the flow advances to step S354; if it is determined in step S454 that the telephone number data between adjacent Ci signals is registered neither as a facsimile communication terminal nor a speech communication terminal, the flow advances to step S458.

In step S458, the same process as in step S430 is performed. If the operation mode "comply with the receive mode" is selected, the flow advances to step S278; if the operation mode "respond only one time" is selected, the flow advances to step S432; if the operation mode "neglect a call" is selected, the flow advances to step S438.

Figure 31:
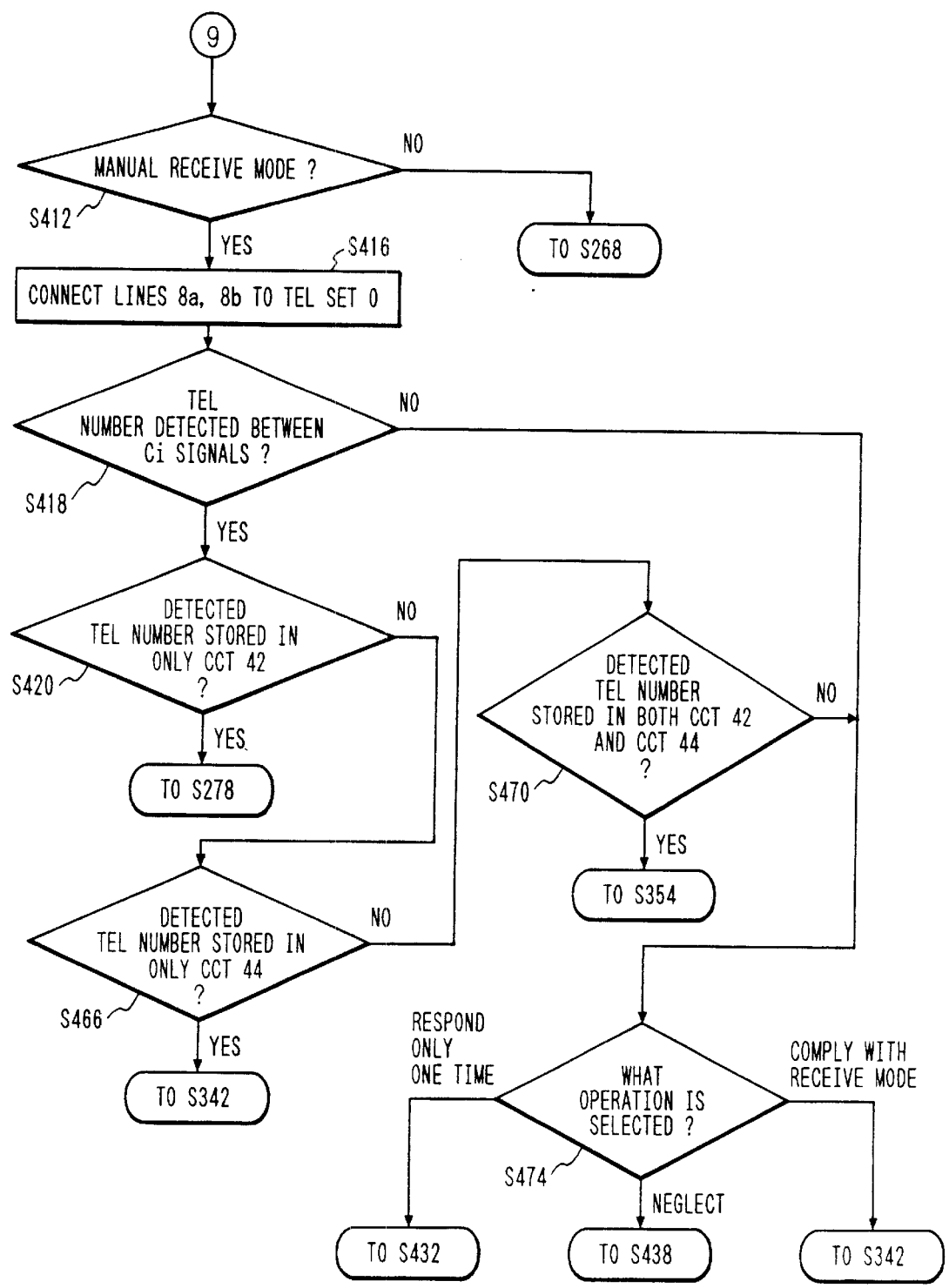
FIG. 31 is a flow chart showing the operation in the third embodiment.

If it is determined in step S418 in FIG. 31 that telephone number data between adjacent Ci signals is not detected, the flow advances to step S474. However, if it is determined in step S418 that telephone number data between adjacent Ci signals is detected, the flow advances to step S420, and the same process as in step S276 is performed. In this case, if the telephone number data between adjacent Ci signals is registered as only a facsimile communication terminal, the flow advances to step S278; if registration of the telephone number data between adjacent Ci signals is not a singular registration only as a facsimile communication terminal, the flow advances to step S466.

In step S466, the same process as in step S282 is performed. If it is determined in step S466 that the telephone number data between adjacent Ci signals is registered as only a speech communication-terminal, the flow advances to step S342; if it is determined in step S466 that registration of the telephone number data between adjacent Ci signals is not a singular registration only as a speech communication terminal, the flow advances to step S470.

In step S470, the same process as in step S283 is performed. If it is determined in step S470 that the telephone number data between adjacent Ci signals is registered as both facsimile and speech communication terminals, the flow advances to step S354; if it is determined in step S470 that the telephone number data between adjacent Ci signals is registered neither as a facsimile communication terminal nor a speech communication terminal, the flow advances to step S474.

In step S474, the same process as in step S430 is performed. If the operation mode "comply with the receive mode" is selected, the flow advances to step S342; if the operation mode "respond only one time" is selected, the flow advances to step S432; if the operation mode "neglect a call" is selected, the flow advances to step S438.

Fourth Embodiment

The fourth embodiment will be described below.

In the fourth embodiment, in addition to the third embodiment, when a facsimile communication is selected, telephone number data sent from a calling party in a pre-procedure is detected, and is compared with telephone number data sent between adjacent Ci signals. If the two telephone number data are identical to each other, the facsimile communication is continued; if the two telephone number data are not identical to each other, one of an operation mode for continuing the reception by preferentially using the telephone number data sent between adjacent Ci signals and an operation mode for terminating the reception by determining a setting error is selected, and the control is made based on the selected operation mode.

Figure 32:
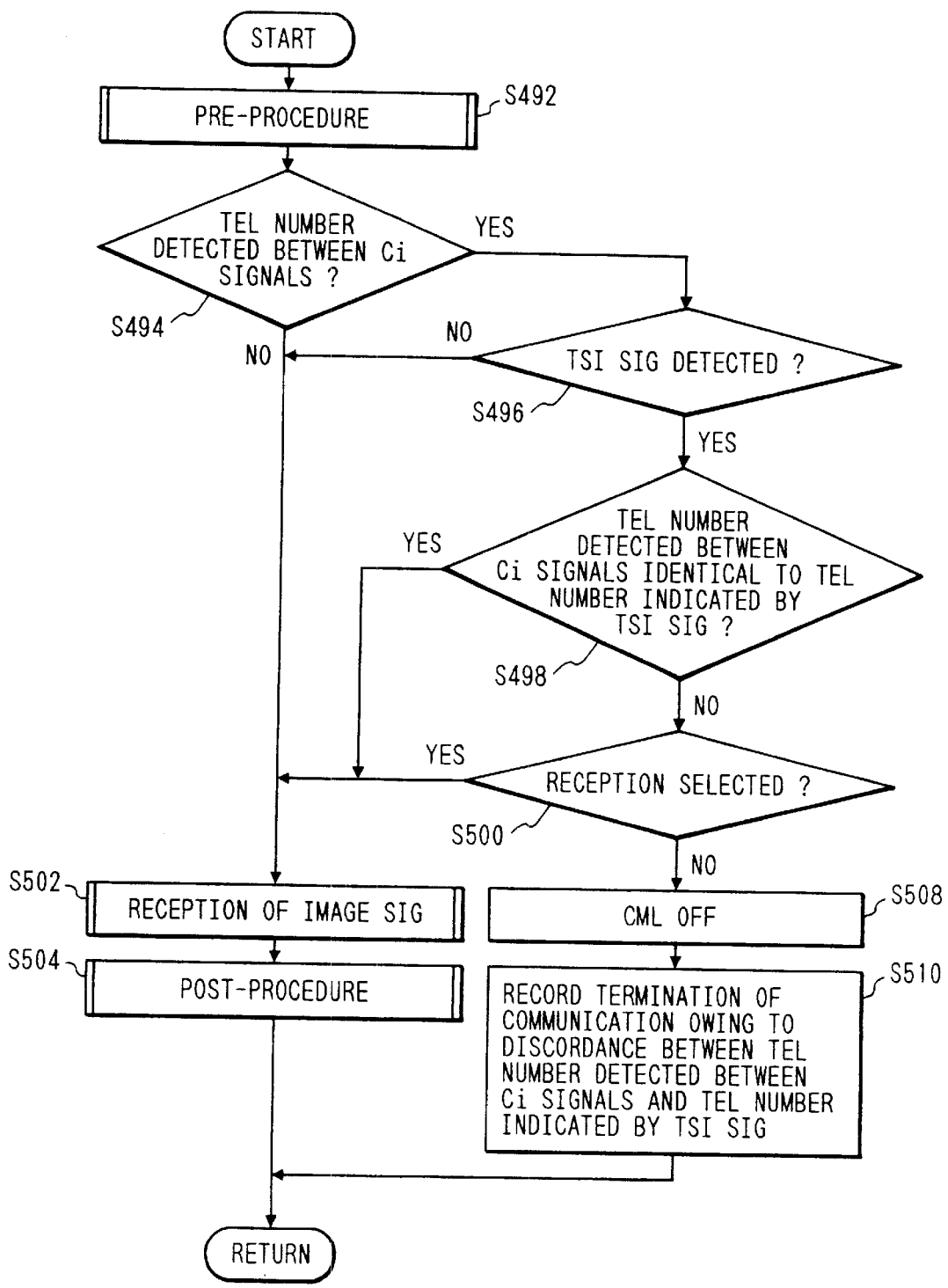
FIG. 32 is a flow chart showing the operation in the fourth embodiment.

FIG. 32 is a flow chart showing the processes different from those in the third embodiment (FIGS. 25 to 31) of the operations of the fourth embodiment.

In FIG. 32, the facsimile reception in step S280 (FIG. 25) or S310 (FIG. 26B) is controlled, as shown in step S492 and subsequent steps.

In step S492, a pre-procedure is performed. In step S494, the same decision as in step S272 (FIG. 25) is made. If it is determined in step S494 that telephone number data between adjacent Ci signals is detected, the flow advances to step S496; otherwise, the flow advances to step S502. In step S502, an image signal is received, and a post-procedure (S504) is performed. Thereafter, the control returns to the main routine.

It is checked in step S496 if a TSI signal (telephone number data of the transmitter side) is detected in the pre-procedure. If YES in step S496, the flow advances to step S498; otherwise, the flow advances to step S502.

It is checked in step S498 if the telephone number data between adjacent Ci signals is identical to the TSI signal. If YES in step S498, the flow advances to step S502; otherwise, the flow advances to step S500.

In step S500, an input for selecting an operation mode executed when the telephone number data between adjacent Ci signals output on the signal line 58$a$ is discordant with the TSI signal is made. If reception is selected, the flow advances to step S502; if reception is to be terminated as a setting error, the flow advances to step S508.

In step S508, a signal of signal level "0" is output onto the signal line 48$a$ to turn off the CML relay. In step S510, a message indicating that the telephone number data between adjacent Ci signals is discordant with the TSI signal, and reception is terminated is recorded in a communication result report.

Fifth Embodiment

The fifth embodiment will be described below.

In the fifth embodiment, in addition to the third and fourth embodiments, one of telephone number data between adjacent Ci signals and telephone number data detected in the pre-procedure is selected as data to be recorded as telephone number data of a partner station in communication result data, and telephone number data to be recorded in the communication result data is determined based on the selection result.

Figure 33:
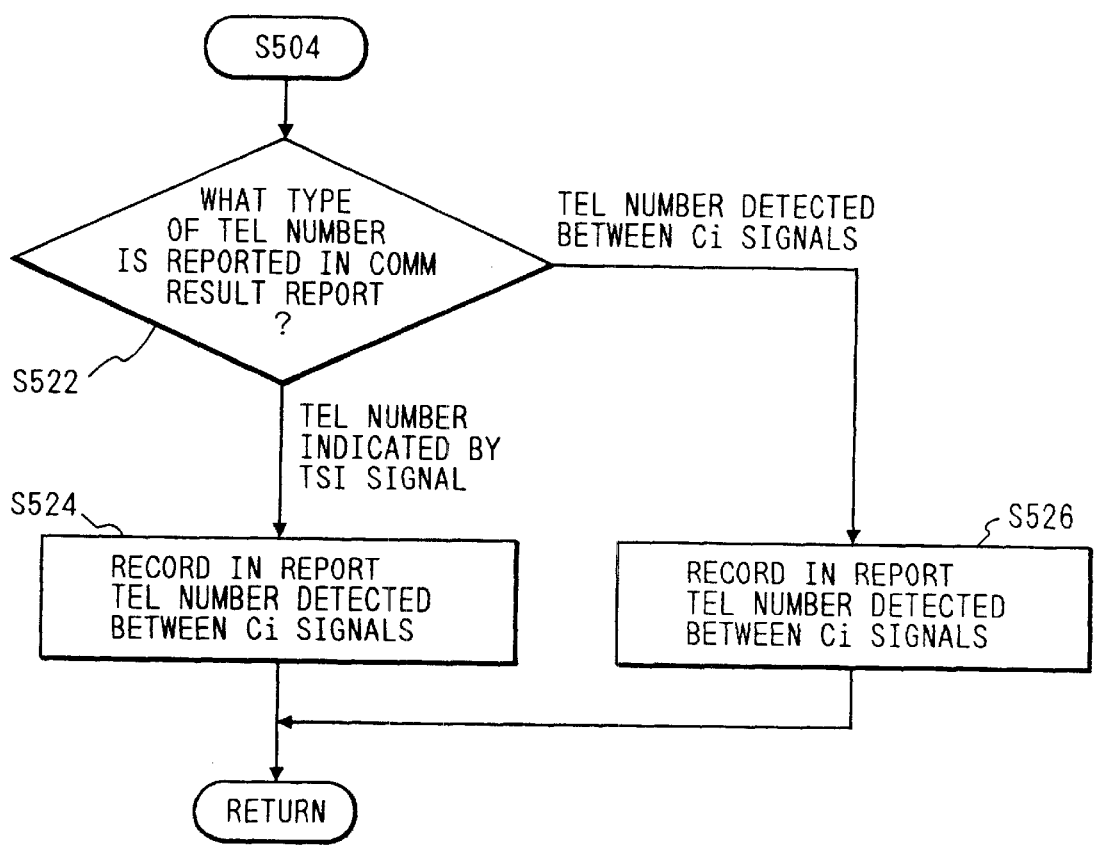
FIG. 33 is a flow chart showing the operation in the fifth embodiment.

FIG. 33 is a flow chart showing the processes different from those in the third and fourth embodiments (FIGS. 25 to 32) of the operations of the fifth embodiment.

After execution of step S504 in FIG. 32, the flow advances to step S522 in FIG. 33. In step S522, the selection result of the type of telephone number data to be recorded in the communication result data, which is output on the signal line 60$a$, is checked. If it is determined in step S522 that the telephone number data between adjacent Ci signals is to be recorded, the flow advances to step S526 to record the telephone number data between adjacent Ci signals in the communication result data; if it is determined in step S522 that the TSI signal is to be recorded, the flow advances to step S524 to record the TSI signal in the communication result data. Thereafter, the control returns to a standby state.

In the third embodiment described above, in the comparison process of telephone number data in step S276 in FIG. 26A, the registration circuit 42 is not limited to a circuit exclusively used for identifying the telephone number of the calling party, but may be commonly used as a call-originating telephone number memory circuit which is used for so-called one-touch dials and abbreviated dials.

In this case, since codes other than subscribers' numbers, such as pause codes required for exchange control registered for call origination, selection numbers of networks, space codes inserted to allow easy visual observation upon registration, and the like, are not included in calling terminal data, these extra codes are removed to coincide with the format of the calling terminal data, and thereafter, comparison of telephone number data is performed.

As described above, according to the third to fifth embodiments, when telephone number data sent between adjacent Ci signals is registered as both those for facsimile and speech communication terminals, the. operation can be simplified, and an apparatus, which is easy to use for a user, can be provided.

The present invention is not limited to the above-mentioned embodiments, and various modifications may be made.

What is claimed is:

1. A communication apparatus comprising:

a detector for detecting a calling signal from a telephone line;

an identification information receiver for receiving and detecting identification information of a partner station from the telephone line before connection with the partner station in response to the calling signal, upon detection of the calling signal by said detector;

a discrimination circuit for discriminating whether or not the partner station is a data communication terminal in accordance with predetermined information received after connection of the telephone line to the partner station; and a controller for allowing execution of a data communication process, execution of a speech communication process, or execution of a discrimination process by said discrimination circuit, in accordance with the received identification information, wherein said controller does not allow a ringer to issue a ring for calling an operator till said discrimination circuit has completed the discrimination process after the detection of the calling signal.

2. A communication apparatus according to claim 1, further comprising a storage unit for registering the identification information of the partner station in a memory therein, so that whether the partner station is a speech or data communication terminal can be discriminated, wherein, in a case where the received identification information has not been stored in the memory, said storage unit registers the received identification information in the memory in accordance with a process executed later.

3. A communication apparatus according to claim 2, wherein said storage unit registers the received identification information in the memory in response to a predetermined manual operation.

4. A communication apparatus according to claim 1, further comprising a storage unit for registering the identification information of the partner station in a memory therein, so that whether the partner station is a speech or data communication terminal can be discriminated, wherein, in a case where the registered identification information corresponds to both speech and data communication, said controller controls said discrimination circuit to execute said discrimination process.

5. A communication apparatus comprising:

a detector for detecting a calling signal from a telephone line;

an identification information receiver for receiving and detecting identification information of a partner station from the telephone line before connection with the partner station in response to the calling signal, upon detection of the calling signal by said detector;

a storage unit for registering the identification information of the partner station and a communication process executed in response to reception of the calling signal in a memory thereof, and for providing the identification information and the communication process with a corresponding relationship;

a setting circuit for selectively setting a mode of said apparatus, the set mode being selected from at least an automatic communication mode for performing data communication in response to the calling signal, a manual communication mode for performing data communication in response to a manual instruction, and an automatic switching mode for selecting data communication or speech communication upon discriminating, based on signals received from the telephone line, whether the partner station is a data communication terminal or a speech communication terminal; and a controller for executing a control operation,
wherein, the controller:
in a case where the received identification information is registered in the memory, the communication process corresponding to the identification information stored in the memory is executed, and
in a case where the identification information of the partner station is not received by said identification information receiver, or in a case where the received identification information is not registered in the memory, a process corresponding to the mode set by said setting means is selectively executed.

6. A communication apparatus according to claim 5, wherein, in the automatic switching mode, said controller discriminates whether or not a signal associated with data communication is received and selects data communication or speech communication based on discrimination of the signal associated with data communication.

7. A communication apparatus according to claim 5, wherein, in the automatic switching mode, said controller discriminates whether or not a null tone state of a reception signal continues for a predetermined period of time and selects data communication or speech communication based on discrimination of the null tone state.

8. A communication apparatus comprising:
a detector for detecting a calling signal from the telephone line;
an identification information receiver for receiving and detecting identification information of a partner station from the telephone line before connection with the partner station in response to the calling signal, upon detection of the calling signal by said detector;
a controller for discriminating, based on the received identification information, whether the partner station is a data communication terminal or a speech communication terminal, and for causing one of data communication and speech communication to be conducted in accordance with a result of discrimination; and
a result memory for storing result information indicating which of the data communication and the speech communication is conducted by said controller, the result information including the received identification information,
wherein said controller discriminates whether the partner station is a data communication terminal or a speech communication terminal based on the identification information stored as a part of the result information in said result memory and the identification information received by said identification information receiver,
wherein the number of pieces of said result information to be stored in said result memory is one or more for one said identification information.

9. A communication apparatus according to claim 8, further comprising a registration storage unit for registering the identification information of the partner station in a memory therein, so that whether the partner station is a speech or data communication terminal can be discriminated,
wherein said registration storage unit registers the received identification information in the memory in accordance with the result information.

10. A communication apparatus according to claim 8, further comprising:
a data terminal interface for connecting a data terminal to said apparatus; and
a transfer circuit for transferring the received identification information to the data terminal through said data terminal interface.

11. A communication method in a communication apparatus that includes
a detection step of detecting a calling signal from the telephone line;
a reception step of receiving identification information of a partner station from the telephone line before connection with the partner station in response to the calling signal, upon detection of the calling signal in said detection step;
a discrimination step of discriminating whether or not the partner station is a data communication terminal in accordance with predetermined information received after connection of the telephone line to the partner station; and
a control step of allowing execution of a data communication process, execution of a speech communication process, or execution of a discrimination process by said discrimination step, in accordance with the received identification information,
wherein said control step does not allow a ringer to issue a ring for calling an operator till completion of the discrimination process in said discrimination step, after said detection step.

12. A communication method according to claim 11, further comprising a registration step of registering the identification information of the partner station in a memory, so that whether the partner station is a speech or data communication terminal can be discriminated,
wherein, in a case where the received identification information has not been stored in the memory, said registration step registers the received identification information in the memory in accordance with a process to be executed later.

13. A communication method according to claim 12, wherein said registration step registers the received identification information in the memory in response to a predetermined manual operation.

14. A communication method according to claim 11, further comprising a registration step of registering the identification information of the partner station in a memory, so that whether the partner station is a speech or data communication terminal can be discriminated,
wherein, in a case where the registered identification information corresponds to both speech and data communication, said control step controls said discrimination step to execute said discrimination process.

15. A communication method in a communication apparatus that includes
a detection step of detecting a calling signal from a telephone line;

a reception step of receiving and detecting identification information of a partner station from the telephone line before connection with the partner station in response to the calling signal, upon detection of the calling signal in said detection step;

a storage step of registering the identification information of the partner station and a communication process executed in response to reception of the calling signal in a memory, and providing the identification information and the communication process with a corresponding relationship;

a mode setting step of selectively setting a mode of the communication apparatus, the set mode being selected from at least an automatic communication mode for performing data communication in response to the calling signal, a manual communication mode for performing data communication in response to a manual instruction, and an automatic switching mode for selecting data communication or speech communication upon discriminating, based on signals received from the telephone line, whether the partner station is a data communication terminal or a speech communication terminal; and a control step of executing a control operation, wherein, the control step comprises:

in a case where the received identification information is registered in the memory, executing the communication process corresponding to the identification information stored in the memory, and in a case where the identification information of the partner station is not received in said reception step, or in a case where the received identification information is not registered in the memory, selectively executing a process corresponding to the mode set in said mode setting step.

16. A communication method in a communication apparatus that includes a detection step of detecting a calling signal from a telephone line;

a reception step of receiving identification information of a partner station from the telephone line before connection with the partner station in response to the calling signal, upon detection of the calling signal in said detection step;

a discrimination step of discriminating, based on the received identification information, whether the partner station is a data communication terminal or a speech communication terminal, and causing one of data communication and speech communication to be conducted in accordance with a discrimination result; and a result storage step of storing result information indicating which of the data communication and the speech communication is conducted in said control step, the result information including the received identification information, wherein said discrimination step discriminates whether the partner station is a data communication terminal or a speech communication terminal based on the identification information stored as a part of the result information in stored in said result storage step and the identification information received in said reception step, wherein the number of pieces of said result information to be stored in said result storage step is one or more for one said identification information.

17. A communication method according to claim 16, further comprising a registration step of registering the identification information of the partner station in a memory, so that whether the partner station is a speech of data communication terminal can be discriminated, wherein said registration step registers the received identification information in the memory in accordance with the result information.

18. A communication method according to claim 16, further comprising a transfer step of transferring the received identification information to an external data terminal connected to the apparatus via a data terminal interface.

* * * * *

UNITED STATES PATENT AND TRADEMARK OFFICE
CERTIFICATE OF CORRECTION

PATENT NO.    : 6,473,493 B2
DATED         : October 29, 2002
INVENTOR(S)   : Toshio Kenmochi et al.

It is certified that error appears in the above-identified patent and that said Letters Patent is hereby corrected as shown below:

Title page,
Item [56], References Cited, FOREIGN PATENT DOCUMENTS, "2158250" should read -- 2-158250 --.

Column 1,
Line 48, "apparatus-must" should read -- apparatus must --.

Column 2,
Line 62, "showing" should be deleted.

Column 5,
Line 19, "from." should read -- from --.

Column 6,
Line 1, "turned." should read -- turned --.
Line 10, "the-detected" should read -- the detected --.

Column 7,
Line 18, "key." should read -- key --.

Column 9,
Line 6, "the-flow" should read -- the flow --.
Line 9, "flow-" should read -- flow --.
Line 16, "the-telephone" should read -- the telephone --.

Column 10,
Line 64, "and: reception" should read -- and reception --.

Column 12,
Line 29, "used-for" should read -- used for --.
Line 60, "are" should read -- is --; and "detected,." should read -- detected, --; and "the." should read -- the --.

UNITED STATES PATENT AND TRADEMARK OFFICE
CERTIFICATE OF CORRECTION

PATENT NO. : 6,473,493 B2
DATED : October 29, 2002
INVENTOR(S) : Toshio Kenmochi et al.

It is certified that error appears in the above-identified patent and that said Letters Patent is hereby corrected as shown below:

Column 13,
Line 3, "signal-" should read -- signal --.
Line 4, "display-circuit" should read -- display circuit --.
Line 18, "telephone," should read -- telephone --.

Column 14,
Line 53, "is-checked" should read -- is checked --.
Line 54, "step." should read -- step --.

Column 15,
Lines 26, 37 and 39, "terminal." should read -- terminal --.
Line 30, "facsimile." should read -- facsimile --.
Line 31, "communication-unit" should read -- communication unit --.
Line 35, "are" should read -- is --.
Line 38, "terminal,." should read -- terminal, --.

Column 16,
Line 12, "perform." should read -- perform --.
Line 15, "states" should read -- state. --.

Column 17,
Line 4, "advances." should read -- advances --.
Line 45, "signals:" should read -- signals --.

Column 18,
Line 48, "not" should be deleted.

Column 19,
Line 10, "advances-to" should read -- advances to --.

UNITED STATES PATENT AND TRADEMARK OFFICE
CERTIFICATE OF CORRECTION

PATENT NO.     : 6,473,493 B2
DATED          : October 29, 2002
INVENTOR(S)    : Toshio Kenmochi et al.

It is certified that error appears in the above-identified patent and that said Letters Patent is hereby corrected as shown below:

<u>Column 26,</u>
Line 20, "in stored" should read -- stored --.

Signed and Sealed this

Tenth Day of June, 2003

JAMES E. ROGAN
*Director of the United States Patent and Trademark Office*